United States Patent [19]

Davini

[11] 4,300,198

[45] Nov. 10, 1981

[54] ROBOT WITH LIGHT-WEIGHT, INERTIA-FREE PROGRAMMING DEVICE

[76] Inventor: Giorgio Davini, Viale Suzzani, 283 Milano, Italy

[21] Appl. No.: 38,249

[22] Filed: May 11, 1979

Related U.S. Application Data

[63] Continuation-in-part of Ser. No. 895,037, Apr. 10, 1978, abandoned, which is a continuation-in-part of Ser. No. 815,440, Jul. 13, 1977, Pat. No. 4,239,432, which is a continuation-in-part of Ser. No. 598,688, Jul. 24, 1975, abandoned.

[30] Foreign Application Priority Data

Oct. 22, 1974 [IT] Italy .............................. 28662 A/74

[51] Int. Cl.³ .......................... G05B 19/42; B25J 9/00
[52] U.S. Cl. ................................. 364/513; 318/568; 414/719; 414/730
[58] Field of Search ............... 364/513, 474, 478, 107; 414/1, 4, 5, 719, 729, 730, 744, 909, 917, 750; 239/DIG. 14, 274; 318/568

[56] References Cited

U.S. PATENT DOCUMENTS

| | | |
|---|---|---|
| 2,213,108 | 8/1940 | Pollard, Jr. .................... 318/568 X |
| 3,241,687 | 3/1966 | Orloff ..................................... 414/5 |
| 3,280,991 | 10/1966 | Melton et al. ......................... 414/5 |
| 3,422,965 | 1/1969 | Lloyd .................................... 414/5 |
| 3,608,743 | 9/1971 | Mosher et al. .................. 212/35 X |
| 3,904,042 | 9/1975 | Colston ................................. 414/1 |
| 3,923,166 | 12/1975 | Fletcher et al. ....................... 414/4 |

Primary Examiner—Joseph F. Ruggiero
Attorney, Agent, or Firm—Robert E. Burns; Emmanuel J. Lobato; Bruce L. Adams

[57] ABSTRACT

A robot having a low-inertia manually actuated arm that functions as a teaching arm for a symmetrically similar powered operating arm disposed on the robot symmetrical thereto. The teaching arm is provided with compensating devices continuously balancing the combination of the teaching arm and a tool removably mounted thereon so that gravitational forces are continuously compensated. The teaching arm is in a state of continual equilibrium so that the tool thereon can be moved manually accurately and smoothly and substantially inertia-free. The teaching arm accordingly functions as a light-weight highly accurate programmer for the powered operating arm of the robot.

10 Claims, 45 Drawing Figures

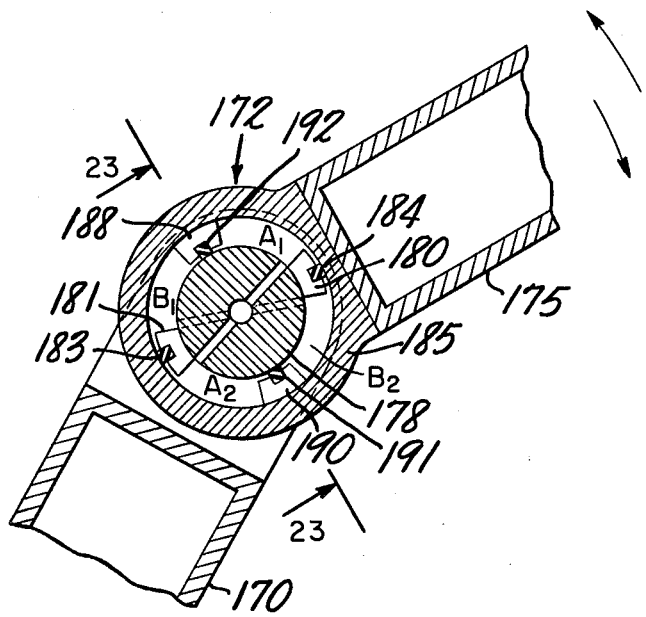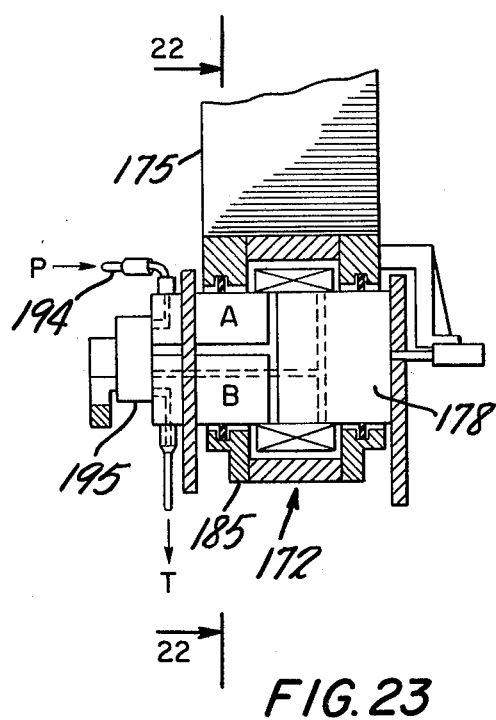
FIG. 22    FIG. 23
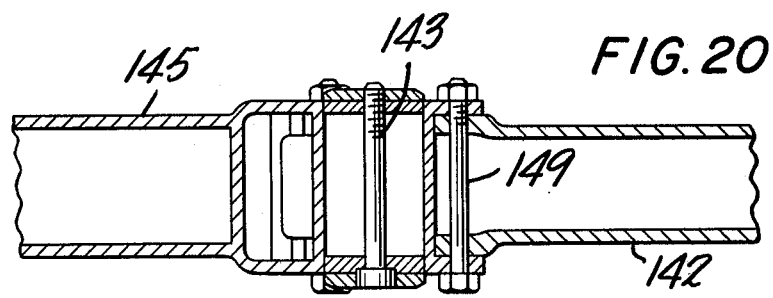
FIG. 20
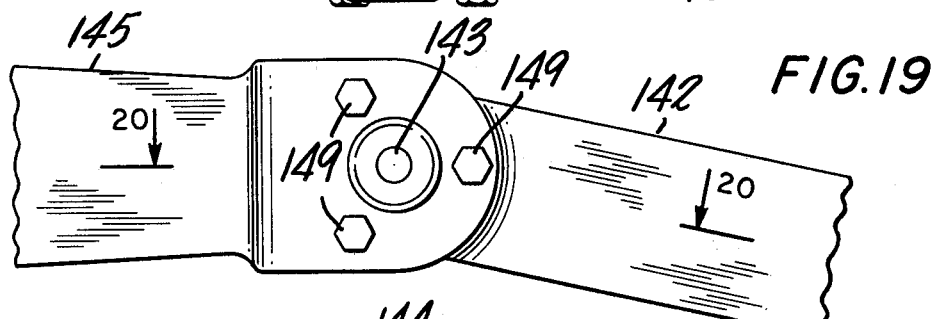
FIG. 19
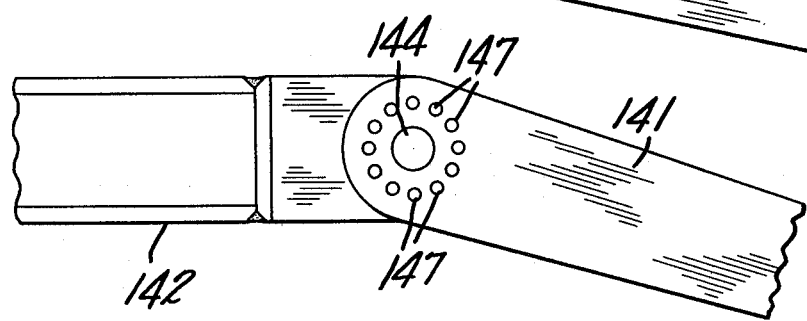
FIG. 18

ROBOT WITH LIGHT-WEIGHT, INERTIA-FREE PROGRAMMING DEVICE

This is a continuation-in-part application of my application Ser. No. 895,037 filed Apr. 10, 1978, now abandoned; which is a continuation-in-part of application Ser. No. 815,440 filed July 13, 1977 U.S. Pat. No. 4,239,431, which is a continuation-in-part application of my application Ser. No. 598,688, July 24, 1975, abandoned.

BACKGROUND OF THE INVENTION

The present invention relates to robots and more particularly to a robot controlled by teachings of a teaching arm thereof.

Robots are used, for example, for working on workpieces in atmospheres in which it is preferable not to have personnel working. These robots are commanded by recorded or memorized commands or instructions developed with respect to a reference system or datum. The recorded commands are converted to electrical signals and applied to an operating or operator robot that carries out the instruction content of the command signals. These command signals generally instruct the operating robot to move a tool to different positions in a three dimensional path.

SUMMARY OF THE INVENTION

It is an object of the present invention to provide a robot with a low-inertia teachable teaching arm manually taught which is dynamically, continuously compensated as to the effect of gravity forces so that it can be smoothly and accurately taught movements of a tool held by it, in three dimensional space.

It is another object to provide a teaching arm of a robot having fluid-actuated compensating devices that substantially maintain the teaching arm and tool combination in a state of continual equilibrium and in which the inertia effects of the teaching arm and tool are substantially eliminated and the gravitational forces are substantially compensated.

It is still another object to provide a robot having a powered operating arm symmetrical to a low-inertia teachable teaching arm which is easily and accurately manually taught movements of a tool in space and whose instructions are imparted to the operating arm.

Still another object is to provide a robot with a removable teachable arm which can be taught while on the robot or remote therefrom or completely separate from and independent from the robot.

According to the invention a teachable arm of the robot is manually taught by a human operator the movements of a tool along a three dimensional path. The movements of the teachable arm are converted to electrical signals which are memorized and stored. These recorded signals are subsequently converted to command signals applied from the memory to a powered operating arm of the robot which will repeat the instruction content of the signals to accurately duplicate all that was taught to the teachable arm which itself is the teaching arm for the operating arm.

The teaching arm is a light-weight, low-inertia teaching arm having an arm-pair defining an elbow arrangement and has a free end on which is held a tool manually movable to a multiplicity of positions along a path in space which is to be duplicated by the operating arm.

The operating arm is symmetrically similar in to the teaching arm that it is an upstanding or vertical arm section having an arm-pair of sections connected by an elbow arrangement defining a horizontal arm portion which has a free end carrying a tool movable in three dimensions to different positions along a path corresponding to the path along which the teaching arm has been taught to move its corresponding tool.

The teaching arm is substantially gravity compensated and has fluid-actuated dynamic balancing or compensating devices continuously balancing the teaching arm so that all the gravitational forces are compensated and continuously substantially maintained in conditions of equilibrium as the teaching arm is actuated. This compensation of gravity forces reduces the effect of braking or deceleration and acceleration forces to solely some effect of the tool and the low-inertia arm so that the teaching arm can be manually moved smoothly and accurately.

The compensating system of the teaching arm is made as two devices which are fluid-actuated and effective to substantially eliminate mass and inertia effects of the teaching arm. Consequently, when an operator moves the tool on the teaching arm through space the only forces he must overcome are substantially the inertial forces of the tool itself. The weight of the tool is compensated. As the operator moves the tool through space the compensating system maintains the tool-teaching arm combination substantially in a state of continual equilibrium so that if the operator removes his hand from the tool it will remain fixed in space.

The two compensating devices each comprise a constant-force applying piston mechanically connected respectively to the teaching arm upstanding arm section and the sections that function as the horizontal portion of the arm. These compensating devices continuously vary the effective lever arm on which the constant force is applied. Thus as the positions of the sections of the teaching arm unit are varied by position thereof the gravitational forces acting thereon are maintained continuously in equilibrium or compensated.

The teaching arm can be mounted on a common base with the operating arm or mounted on a separate light-weight mount that is mounted with reference to the operating arm and both arms have the same reference or datum.

BRIEF DESCRIPTION OF THE DRAWINGS

A robot according to the present invention for teaching and controlling operations is set forth in the appended claims and illustrated in the drawings in which:

FIGS. 18-20, are fragmentary views of a powered operating arm unit of a robot of the type illustrated in FIG. 17;

FIGS. 22-23, are cross section views of a fluid motor or actuator for a powered operating arm of a robot according to the invention;

DESCRIPTION OF THE PREFERRED EMBODIMENTS

A robot according to the invention is disclosed and is a robot programmed semi-automatically by a teaching arm of a type hereinafter described. In order for the teaching arm to develop accurately signals representative of the movement of a tool thereon in a pattern or path in space the teaching arm must have certain characteristics as later described.

Figure 1:
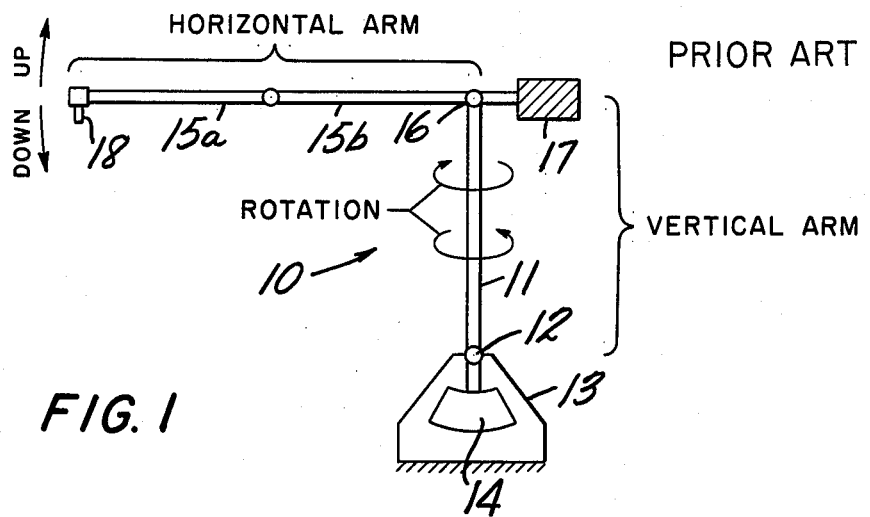
FIG. 1 is a diagram for illustrating gravity compensating principles of the prior art.

A teaching arm 10 is illustrated in FIG. 1 and the drawing is illustrative of the known method of balancing a teaching arm or programmer. As shown a vertical section 11 is pivoted at 12 for movement on a base 13 relative to the vertical and is provided with a counterweight 14 to balance it. A horizontal arm has sections 15a, 15b pivotal relative to each other and pivotally mounted at 16 for movement to and up and down from a horizontal position. It is balanced by a counterweight 17. Assuming that such a programmer were provided with a tool connected at 18 and the tool were moved in a pattern or path to be memorized and repeated it can be seen that the counterweights create additional problems due to the high inertia.

In order to move the free end of the upper arm section 15 in a path along three dimensions the vertical arm section must be pivoted about its pivot 12 and rotated about its longitudinal axis. The horizontal arm must be movable up and down about its pivot at 16. Thus it can be seen that the use of counterweights for balancing such a structure introduces the effect of inertia of the masses of the counterweights. Thus to move the tool, not shown, fixed at 18 the inertia of the counterweights must be overcome and as the free end is moved in different directions the braking and change of direction is subject to the inertia deceleration and acceleration forces due to one or both of the counterweights. Thus the tool cannot be moved easily and smoothly in space. The use of counterweights as a viable compensating technique for gravitational forces must be rejected.

Figures 2, 3:
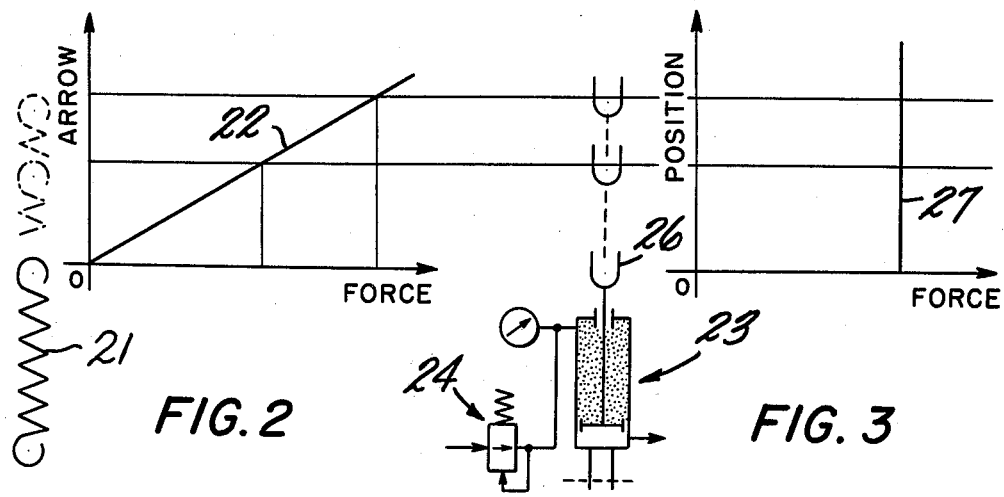
FIG. 2 is a diagram illustrating principles of the use of a spring force for compensating gravitation force in compensating devices.
FIG. 3 is a diagrammatic illustration of the principle of a pneumatic compensating device according to the invention.

Compensation for the varying effect of gravitational forces acting on the arm unit in FIG. 1 cannot be accomplished by the use of spring devices. As can be seen in FIG. 2 a spring 21, stretched in an upward direction as shown by the arrow, can only apply a variable force illustrated by a solid line 22. As the positions of the arm unit 10 vary the center of gravity of each of the two sections of the arm vary and there could be no continuous constant and accurate compensation for the effect of gravitational forces by use of a spring or springs could not be effected.

However, a hydraulic system can be constructed to continuously apply a constant force. Thus as illustrated diagrammatically in FIG. 3 a pneumatic cylinder 23 maintained at a constant pressure by a constant pressure valve or regulator 24 applies a constant force for each position of a piston rod connection of a fluid-actuated piston as shown by a solid vertical line 27. This principle is made use of in compensating devices in a robot according to the present invention described below. According to the invention the elimination of the use of counterweights requires the use of a balancing or compensating system generating a force which is constant while the effective point of application is changing widely.

The use of the principle of a dynamic pneumatic compensating system in an arm construction having upstanding and two horizontal arm sections requires the use of a compensating cylinder or device for each of the two arm sections. Each arm section has a different movement so that dividing compensation of gravitational forces between two devices in a compensating system increases the accuracy and completeness of the compensation. Furthermore, the point at which compensation or balancing forces are applied is important as later explained.

Figures 4, 5:
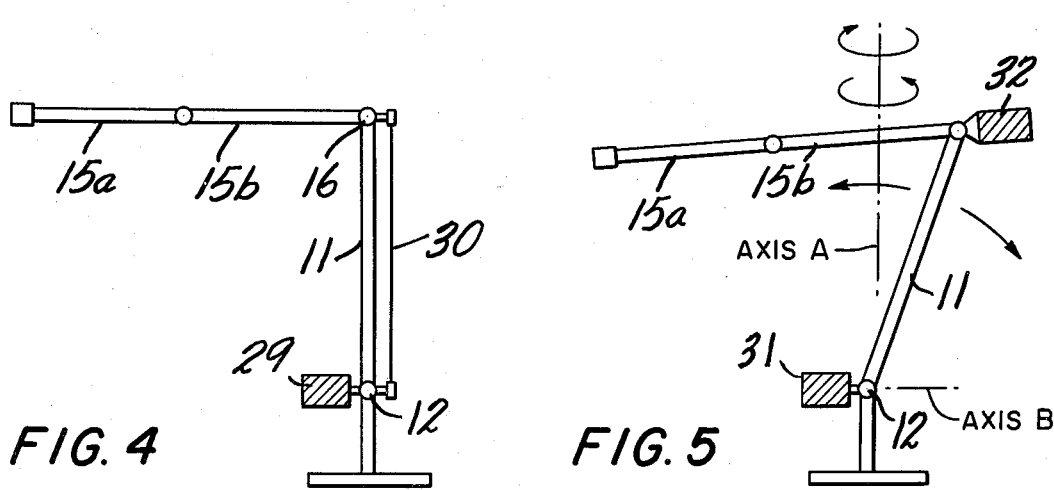
FIGS. 4 and 5 are diagrams illustrating different positions of counterweights.

As seen in FIGS. 4 and 5 the use of a compensating system (two devices as later explained) is shown diagrammatically as a unit at 29. The compensating system is located adjacent the pivot axis 12. In order to compensate for the upper arm sections 15a, 15b movements a mechanical connection 30 to the compensating system 29 separating the compensation is necessary. Separation by using two pneumatic cylinders 31, 32 with each located on a respective arm as shown in FIG. 5 would still result in the absence of compensation for inertia forces. Mounting a compensating device 32 on the upper arm sections increases inertia whenever the arm sections pivot relative to an axis B corresponding to the pivot 12 and as the arm sections move relative to a vertical axis A corresponding to the true vertical position of the upstanding arm section 11.

Figure 6:
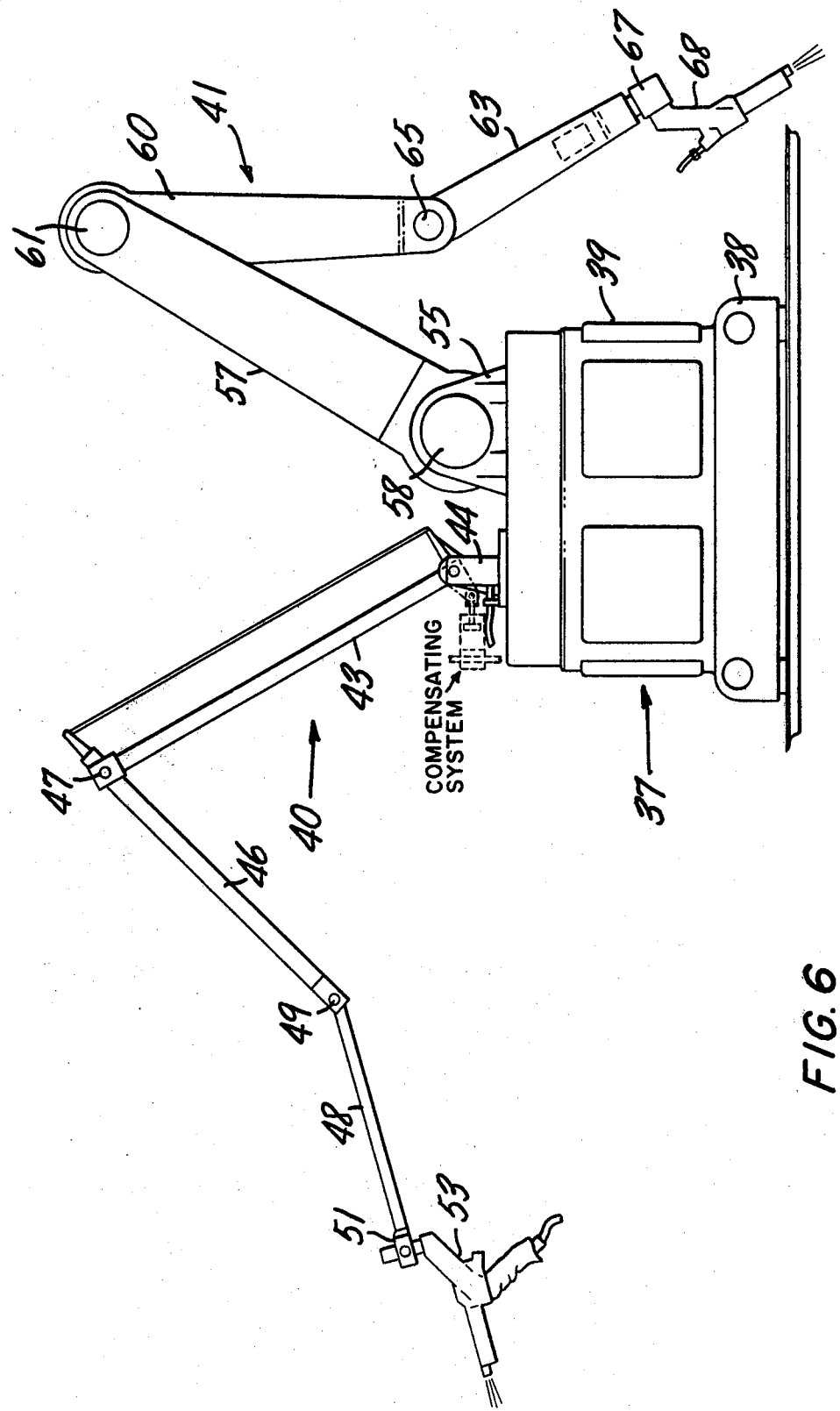
FIG. 6 is a side elevation view of a robot according to the invention.

A robot 37 according to the present invention is illustrated in FIG. 6. It comprises a base 38 on which is mounted a mount or pedestal 39 on which is mounted a teaching arm unit 40 and an operating arm unit 41. The teaching arm has a first or upstanding arm section 43 pivotally mounted for universal movement on a tower 44 which is removably mounted on the pedestal or mount 39. A second arm section 46 is pivotally mounted at 47 on an upper end of the first arm section 43. A third arm section 48 is pivotally mounted at an elbow connection 49 on the second arm section and the second and third arm sections 46, 48 form a horizontal arm portion which can be moved up and down from the horizontal. The upstanding arm 43 can be moved relative to a vertical position and rotated. The horizontal arm portion has a wrist 51 pivotally mounting a tool, for example a painting or spray gun 53.

The operating arm unit 41 is mounted on the common pedestal 39 on a mount 55 and has an upstanding first or vertical arm section 57 powered by a fluid motor for movement to a vertical position and relative thereto. The mount 55 is powered for rotation as later explained. The first operating arm section has connected thereto a second arm section 60 powered by a fluid-actuated motor or actuator 61. A third arm section 63 is connected in a pre-set way to the second arm section. The second and third arm sections of the operating arm unit form a horizontal arm having a powered wrist 67 mounting a paint or spray gun 68.

In practice the robot 37 is used in an atmosphere in which the atmosphere may be very polluting such as in a spray painting space in which vehicles are painted. The teaching arm unit 40 is a light-weight, low inertia unit and a human operator teaches it a desired movement or path of the paint gun 53 by actually manipulating this gun in spraying a workpiece. The movements, as later explained are converted to signals which are memorized and used to program and command the operating arm unit 41. Once the teachable teaching arm unit 40 has been taught the pedestal 39 is rotated through a 180° and the operating arm unit is then disposed in the same position at which the teaching arm was taught and it can then duplicate the movements of the teaching arm and move the paint gun 68 through the same movements that the teaching gun 53 was moved while the teaching arm unit was used for painting. The operating arm unit will paint other similar workpieces. While the operating arm unit 41 is painting the teaching arm unit 40 can be removed from the robot to remove it from a corrosive atmosphere.

Figure 7:
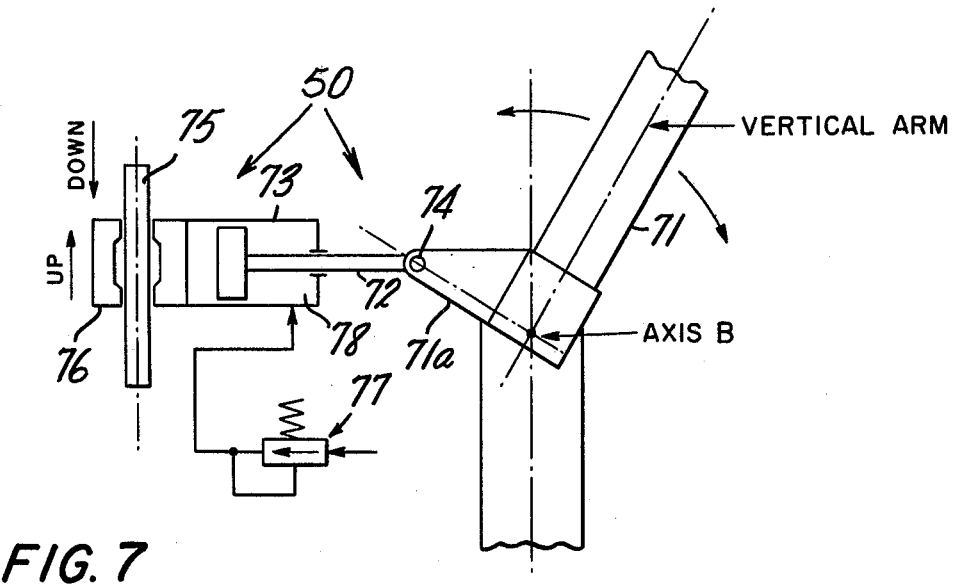
FIG. 7 is a diagrammatic illustration of a compensating device according to the invention.

The compensating principles of the dynamic compensating system of both the upright arm and horizontal arm of the teaching arm according to the invention are illustrated in FIGS. 7-10 inclusive. A balancing device or dynamic compensating device or system 50 illustrated in FIG. 7 is connected to a vertical arm section 71 pivotal about a horizontal axis B. This arm is that of a teaching arm unit. The vertical arm section 71 has a small arm 71a connected to a piston rod 72 of a piston reciprocable in a pneumatic cylinder 73. The connection is at a pivotal pin 74. The cylinder is guided for vertical movement on a guide 75 through a guide sleeve 76 fixed to the cylinder. A regulator 77 maintains a constant air pressure in a chamber 78. The cylinder can move up and down as the vertical arm section 71 reciprocates back and forth about its horizontal pivot axis. The axis of the pin 74 and the axis B are disposed parallel but each in a different horizontal plane and different vertical planes passing through separate axes.

Figure 8:
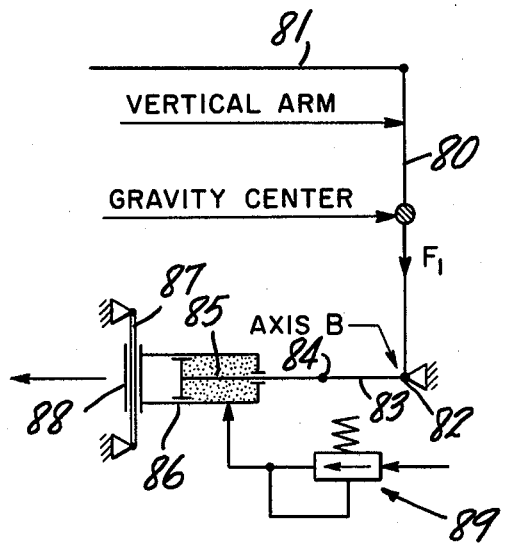
FIGS. 8 and 9 are diagrams illustrating the principles of a compensating device according to the invention.

Assuming a compensating system as diagrammatically shown in FIG. 8 is used, which is similar to that in FIG. 7, a vertical arm section 80 and horizontal arm section 81 are pivotally connected and pivoted about a pivot axis 82. Here a connection arm 83 is connected to a pivot pin 84 connected to a piston rod 85 of a piston reciprocable in a cylinder 86 removably upwardly and downwardly on a vertical guide 87 through a guide sleeve 88.

The center of gravity of the vertical arm section in the vertical position is directly in the vertical plane passing through the pivot axis 82. Therefore, the vertical arm section requires no compensation ($F_2=0$). Although there is always a constant fluid or air pressure in the cylinder 86 under control of a constant air pressure regulator 89 of an air supply system there is no torque because the axis of the piston rod 85 is aligned with the pin 84 and the axis 82. ($M_t = F_1 \times 0 = 0$).

Figure 9:
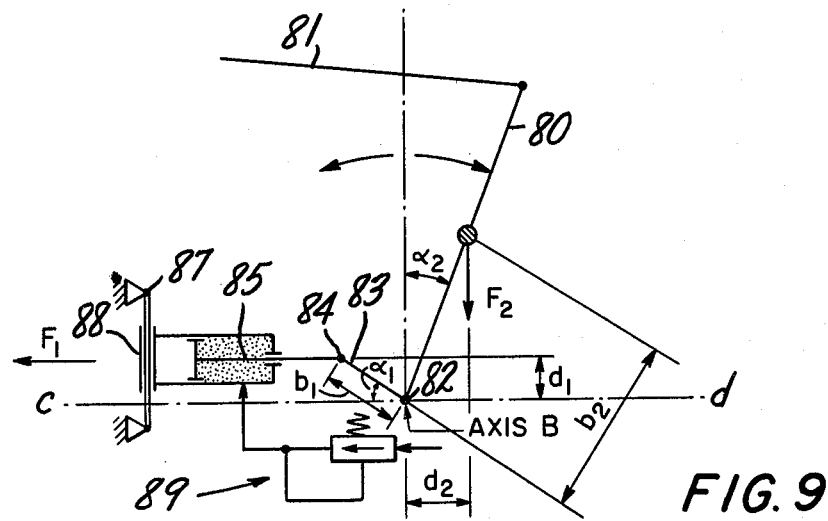

If we assume that the vertical arm section 80 is displaced in a backward direction as shown in FIG. 9 the center of gravity thereof is disposed backwardly so that a torque $M_t - F_2 \times d_2$ acts about the axis 82. Since the arm 83 is rigidly connected to the vertical arm between the pivot pin 84 and the pivot axis 82 an angle of 90° is formed between it and the vertical arm 80 so that $\alpha 1 = \alpha 2$. To equilibrate the vertical arm, which generates the force $F_2$ with its weight, the fluid-actuated compensating system must give a force $F_1 = F_2 \times b_2 / b_1$. In this case the vertical arm is stabilized for each position of the upstanding arm section in the tilted position thereof. This obtains as long as the upstanding or vertical arm section moves within the line c-d.

Figure 10:
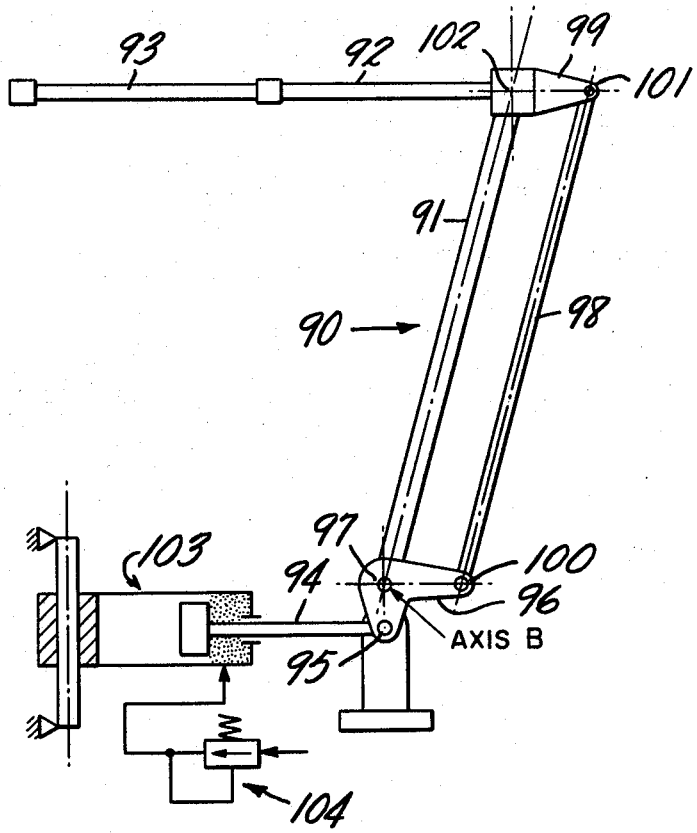
FIG. 10 is a diagrammatic side elevation view of another compensating device of a compensating system according to the invention.

The horizontal arm portion of a teaching arm according to the invention is balanced in a similar way. As illustrated in FIG. 10 a teaching arm assembly or unit 90 having a vertical arm section 91 and horizontal arm sections 92, 93 connected to a balancing or compensating device similar to that described heretofore. In this instance a piston rod 94 is connected by a pivot pin 95 to a lever 96 pivoted about a pivot axis 97. A transmission rod 98 is pivotally connected to the lever arm 96 and to a short arm 99 by pivot 100, 101. The horizontal arm sections are pivoted at 102 on the vertical arm section 91. The balancing or compensating device 103 has a constant air pressure maintained therein by a constant air pressure regulator 104 from an air pressure source, not shown. As the horizontal arm unit 92, 93 moves up or down from the horizontal position thereof the pressure regulator 104 maintains a constant air pressure and balances the horizontal arm unit. That is it compensates for the gravitational forces acting thereon.

It will be noted that the pivot 97 and the pivot 102 connection of the transmission rod 98 to the lever arm 96 are parallel. The longitudinal axis of the vertical arm 91 is parallel to the longitudinal axis of the transmission rod 98. The pivot 95 is in a plane in which the pivot 97 is disposed and this plane is at 90° to a plane passing through the pivot 97 and the pivot 100. The distance from the pivot 101 to the pivot 102 is equal to the distance between the lower pivots 97 and 100.

Figure 11:
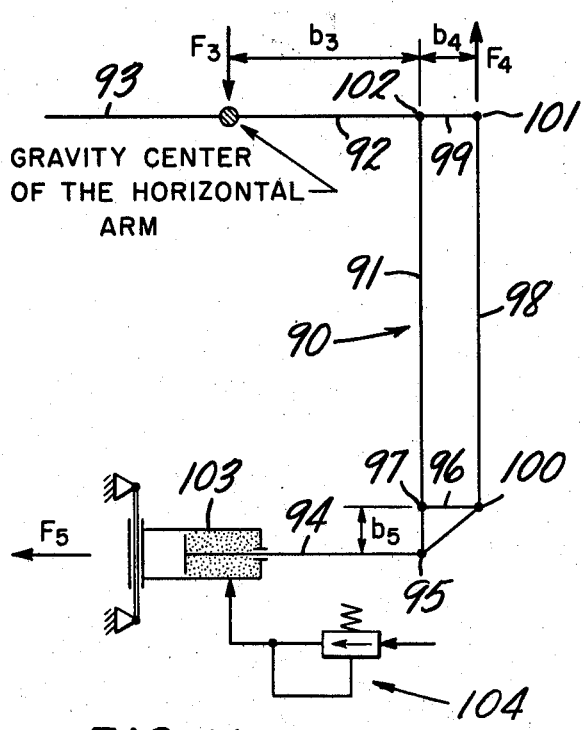
FIGS. 11 and 12 are diagrams illustrating the principles of a compensating device of the type illustrated in FIG. 10.

A diagrammatic illustration of the teaching arm unit 90 and its balancing system is shown in FIG. 11. As can be seen in FIG. 11 the horizontal arm unit 92, 93 is illustrated in an exactly horizontal position. The center of gravity is accordingly at a maximum horizontal distance from the pivot 102 and accordingly a torque $(F_3 \times b_3)$ is generated. This torque generates a force $F_4 = (F_3 \times b_3)/b_4$ at the end of the short arm 99. The force $F_4$ is transmitted by the transmission rod 98 to the lever 96 which transmits a force $F_5 = (F_3 \times b_3)/b_5$ to the cylinder of the balancing or compensating system 103. The horizontal arm unit is balanced through the regulation of the constant air pressure in the chamber of the cylinder by the regulator so that it is maintained constant.

Figure 12:
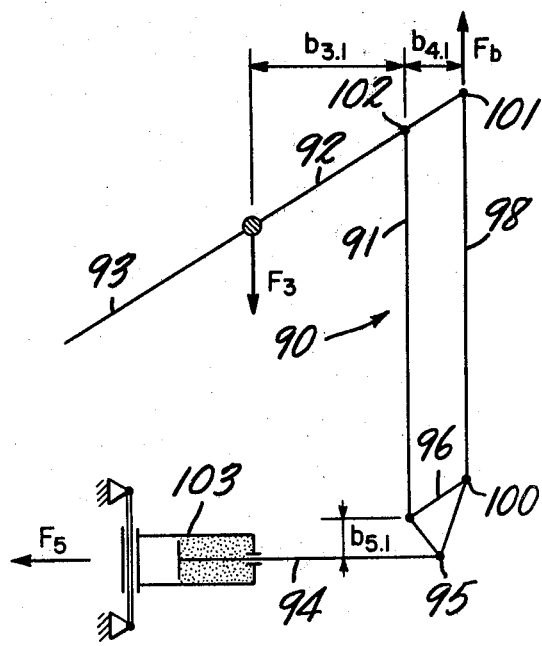

In FIG. 12 the horizontal arm unit 92, 93 is disposed below the horizontal position or in a lowered position so that its center of gravity is disposed rearwardly from its position when the arm is horizontal and is toward the upright arm section 91. A torque $(F_3 \times b_{3.1})$ is developed and is less than the torque developed when the horizontal arm sections 92, 93 are in a horizontal position.

The structure elements 91, 98, 97, 96, 99, 103, 104 cause the lever to change according to the position of the horizontal arm. Since the balancing or compensating system constantly develops a constant force F5 the system is constantly in a balancing condition while the position of the horizontal arm sections change positions relative to the horizontal. Thus the teaching arm unit is constantly in a balanced condition and the tool thereon can be easily moved in three dimensions along a path including back and forth movements and the movements used to develop electrical signals memorized as command signals for the operating arm unit as before and hereafter described.

According to FIG. 12, the center of gravity is at a distance shorter than the maximum from the pivot 102 and therefore there is generated a torque $M_t = F_3 \times b_{3.1}$. This torque generates a force $F_b$ at the end of the short arm 99 $F_b = (F_3 \times b_{3.1})/b_{4.1}$. The force $F_b$ is transmitted by the transmission rod 98 to the lever 96 which transmits a force $F_5 = (F_3 \times b_{3.1})/b_{5.1}$. The distances $b_{3.1}$ and $b_{5.1}$, when varied, are always proportional.

In order that the operating arm unit duplicate the movements taught to it by the teaching arm unit and carry out these same movements along the self same path along which the original teaching movements were made the operating arm unit must be placed in the same reference position as the teaching arm unit with respect to that path and movements.

Figure 13:
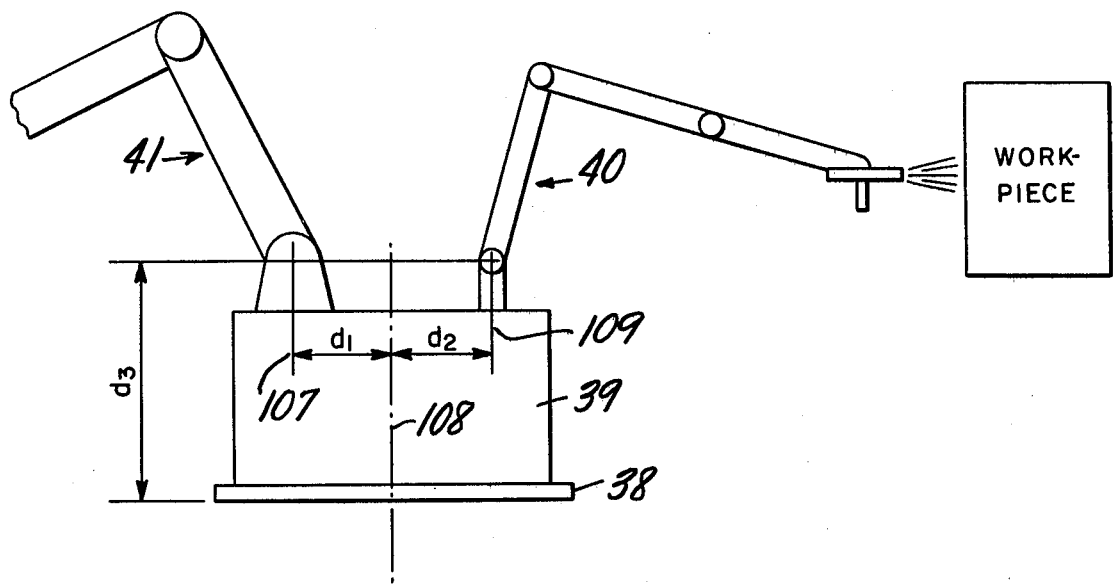
FIGS. 13-14 are diagrams for illustrating principles of the robot in FIG. 6.

This is accomplished by having the teaching arm unit 40 and the operating arm unit 41 mounted on a same base as shown in the drawings in FIGS. 1 and 13. The base 38 has pedestal 39 which is rotatable 180° about the support base. The distance $d_1$ from the axis of rotation 107 of the operating arm unit 41 from an axis of rotation 108 of the pedestal 39 is equal to a distance $d_2$ of an axis of rotation 109 from the axis of rotation of the base pedestal. Moreover, the pivotal axes of each of the arm units for movement relative to the base are an equal vertical distance $d_3$ from a plane passing through a plane corresponding to the bottom of the support base. All the axes of rotation 107, 108 and 109 are parallel. Thus the reference position of the teaching arm unit relative to the workpiece in FIG. 13 can readily be established as the reference position for the operating arm unit by simply rotating the base through 180° and then locking the pedestal by a lock, not shown, in the reference position relative to which the operating arm unit carries out its commands duplicating exactly the movements of the teaching arm unit.

Figure 14:
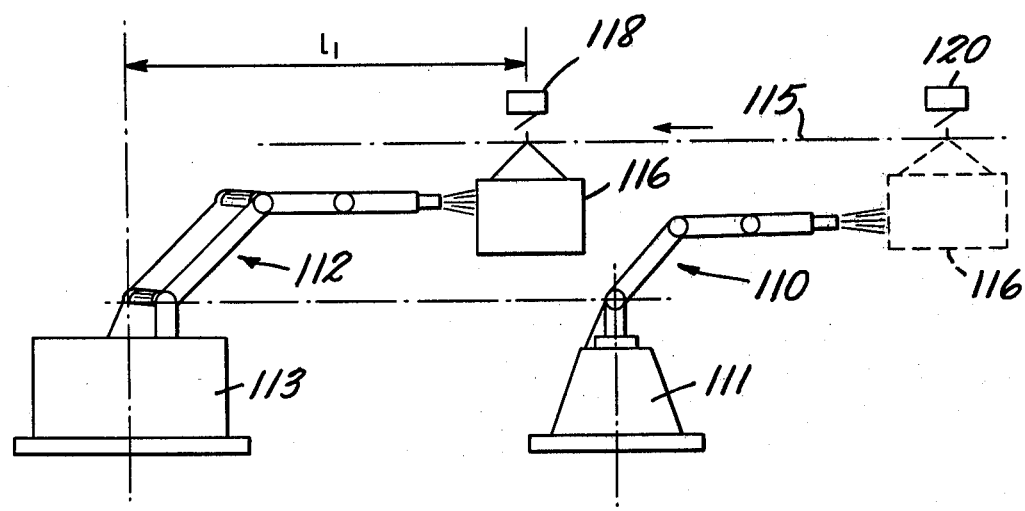

It will be understood that the teaching arm unit need not be mounted on a common base with the operating robot or arm. The teaching arm can be mounted on a separate base, later described as remote from the operating arm unit, so as the commands to the operating arm unit compensate for the distance of the reference position of the operating arm unit. Thus as shown diagrammatically in FIG. 14 a teaching arm unit 110 has its own mount 111 remote from an operating robot 112 having its own mount 113.

For purposes of illustrating this mode of use of the invention it will be assumed that a transfer line or conveyor 115 is moving a plurality of similar workpieces 116 from the right toward the left so that the teaching arm unit is disposed upstream of the operating robot 112. A plurality of workpieces are being moved spaced by the transport conveyor 115. The teaching arm unit 110 is taught its commands relative to a given workpiece 116 and that workpiece is then advanced to the next station where the operating robot 112 carries out the instructions of the teaching arm unit. In order to establish a reference system from which the two arm units are operating under the same conditions the distance $L_1$, from a detector 118 to the axis of movement of the operating robot 112 must equal a distance from a detector 120 to the axis of the teaching arm unit 110.

In order to carry out the command signals a system within which the operating robot and the teaching arm unit operate must take the information from the detectors and apply it to the ultimate command signals for compensating and establishing the common reference. These techniques of signal development, however, are well known.

Figure 15:
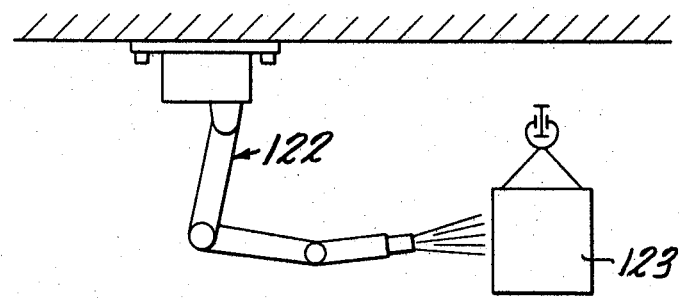
FIG. 15 is a diagram for illustrating use of a robot of the invention in an inverted condition.

The operating robot is generally disposed on a flat floor level with the teaching arm upright. However, an operating robot 122 can operate in a depending position as illustrated in FIG. 15. Thus a free or clear area is available below it and a workpiece 123 being treated or painted as illustrated in FIG. 15.

Figure 16:
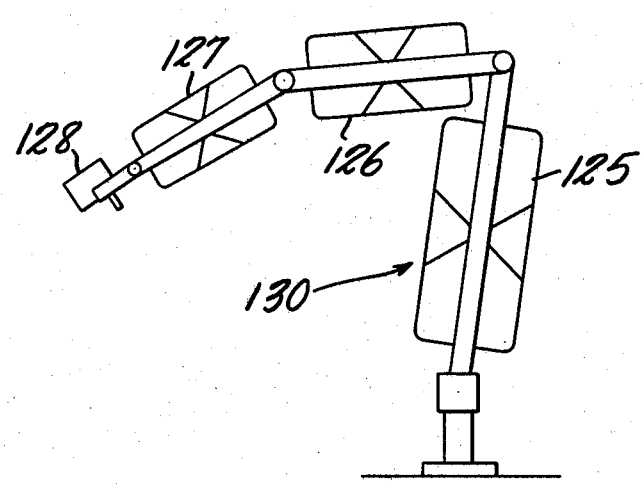
FIG. 16, is a diagrammatic elevation view of a teaching arm unit of the invention.
Figure 17:
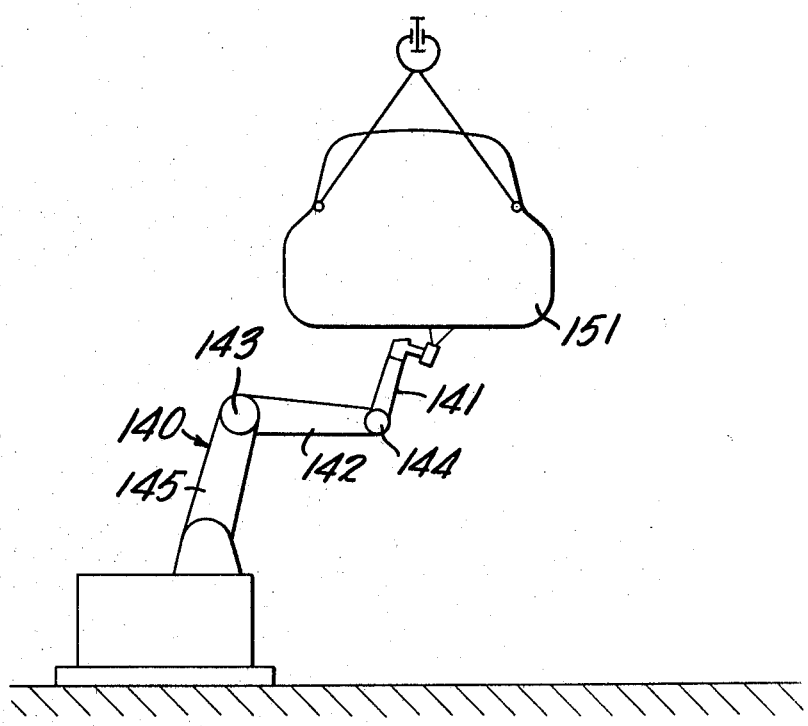
FIG. 17, is a diagrammatic elevation view of another embodiment of a robot according to the invention.

The teaching arm unit is much lighter than the operating arm unit and is made dimensionally symmetrical with respect to the operating arm. It is also smaller in thickness of its members with respect to the operating arm unit. Accordingly it may happen that the area within which the operating arm unit is to operate places certain encumbrances on the movements of the operating arm unit. For example, there may be obstacles present in the operating zone which must be taken into consideration with respect to the movements of the more massive operating arm unit. In order for the smaller teaching arm unit to take into consideration these encumbrances on the movement of the operating arm unit, which place limits thereon, a plurality of simulators 125–128 are provided as shown in FIG. 16 in a diagrammatic illustration of a teaching arm unit 130. These simulators 125–128 are made as wire structures securable on to the various arm sections of the teaching arm unit as illustrated. They may be made with a bright color such as yellow so that the manual operator of the teaching arm unit has a good visibility thereof. Thus as the manual operator moves the teaching arm unit 130 the simulators simulate at least the thickness dimensions of the main or operating arm unit so that the manual operator is encumbered or limited as to movements relative to a workpiece, not shown, in a same manner in which the dimensions of the operating arm unit limit the movements of the operating arm unit in a given system. The teaching then can take place encumbered in the manner in which the dimensional restraints are imposed on the operating arm unit. Of course the simulators can be dimensioned to allow greater clearance on encumbrances than solely simulating the thickness of the elements of the operating arm unit.

The operating arm unit is relatively massive with respect to the teaching arm unit and is made of an arm pair of sections. The upstanding or upright arm section and the horizontal arm sections which are made as two arm sections have an elbow. The arm-pair and arm sections are driven by fluid motors as stated above. However, the operating arm unit can also be constructed so that the horizontal unit position arm is preset relative to the upstanding arm unit. In FIGS. 17–20 a construction of an operating arm unit 140 which is preset is illustrated. The horizontal arm sections 141, 142 are fixed at joints 143 and 144 so that the pre-set relative position of the horizontal arm sections is maintained. The upstanding arm thereof can move. The horizontal arm sections are constructed as a front arm section 141 and a rear arm portion 142 and the joint 144 is constructed with a plurality of pins 147 spaced apart angularly about 15° for fixing the two arm sections in different pre-set angular positions. The rear arm section 142 can be fixed at the joint 143 on the upstanding arm 145 by pins 149 angularly spaced. The pins extend through openings in the two arm sections in registry at the connection thereof. The arm sections are tubular and set selectively in desired angular relative positions; then the pins are inserted into the holes in the two joints to maintain the preset relative angular positions. Thus in the example in FIG. 17 the robot is preset because it is used to make a given set of movements that do not vary as to the horizontal arm sections to paint the underside of a car body 151 as illustrated.

Figure 21:
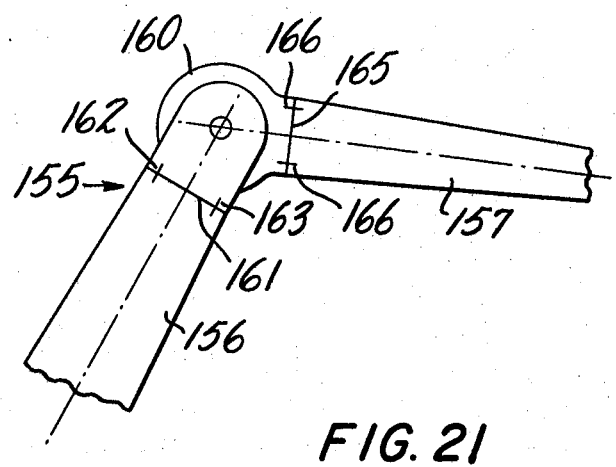
FIG. 21, is a fragmentary side view of another embodiment of an operating arm unit of a robot according to the invention.

The operating arm unit is actuated or powered by fluid-actuated actuators later described. Provision is made in the invention for replacing the actuators and for interchanging different length horizontal sections of the horizontal arm portion on a same upstanding or upright arm section. An illustration of these principles is set forth in FIG. 21 wherein there is fragmentarily shown an operating arm unit 155 having an upright arm section 156 and a rear arm section 157 of horizontal arm sections actuated by a fluid dynamic actuator 160. The actuator 160 is removably mounted on the upstanding arm 156 along a surface 161 by a plurality of bolts, for example four of such bolts 163.

The horizontal arm section 157 is mounted on the actuator 160 along a surface 165 by a plurality of bolts 166, for example four bolts. The construction thus provides for easy replacement or interchange of the dynamic fluid actuator 160 and for exchange of the horizontal arm sections with other horizontal arm sections. These exchangeable horizontal arms can be of different lengths. For example, the painting of a van body by the operating robot requires for greater efficiency, longer horizontal arm sections than is the case for painting of a car body since longer sweeping movements on the part of the horizontal arm are required in painting a van body.

Moreover, the horizontal arm sections need not be straight as illustrated in the drawings described. The interchangeable arms may have any desired shape such as being bent or offset sidewise, upwardly or downwardly as later described.

A type of fluid actuator or hydraulic motor according to the invention for powering the operating arm sections is illustrated in FIGS. 22 and 23. Therein, for example, an upstanding arm section 170 has a dynamic fluid actuator 172 mounted thereon for actuating a horizontal arm section 175 which is a rear arm section shown fragmentarily. A pivot is mounted on the horizontal arm on which is mounted a rotor 178 having blades or vanes 180, 181 fixed thereto which have seals 183, 184. The housing 185 for the rotor of the fluid motor is fixed to the rear arm section 175 of the horizontal arm unit and it has fixed vanes or blades 188, 190 that have seals 191, 192 making a fluidtight seal with the rotor so that the motor housing is divided into two sets of chambers $A_1$, $A_2$ and $B_1$, $B_2$.

The motor is driven by a hydraulic fluid supplied under pressure as later explained from a source to hose connections 194 to a servo value 195 for applying pressure to the blades fixed to the rotor so that the rotor rotates to actuate the horizontal arm section 175 upwardly and downwardly relative to a horizontal position for moving in accordance with the movements taught by the teaching arm unit.

Figure 24:
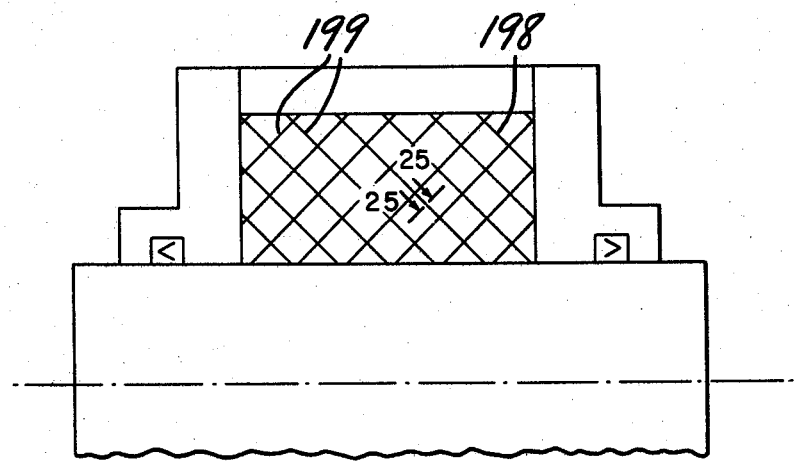
FIGS. 24-25, are diagrammatic views of elements of the fluid motor in FIGS. 22-23.
Figure 25:
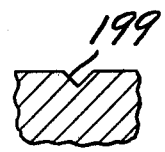
Figure 26:
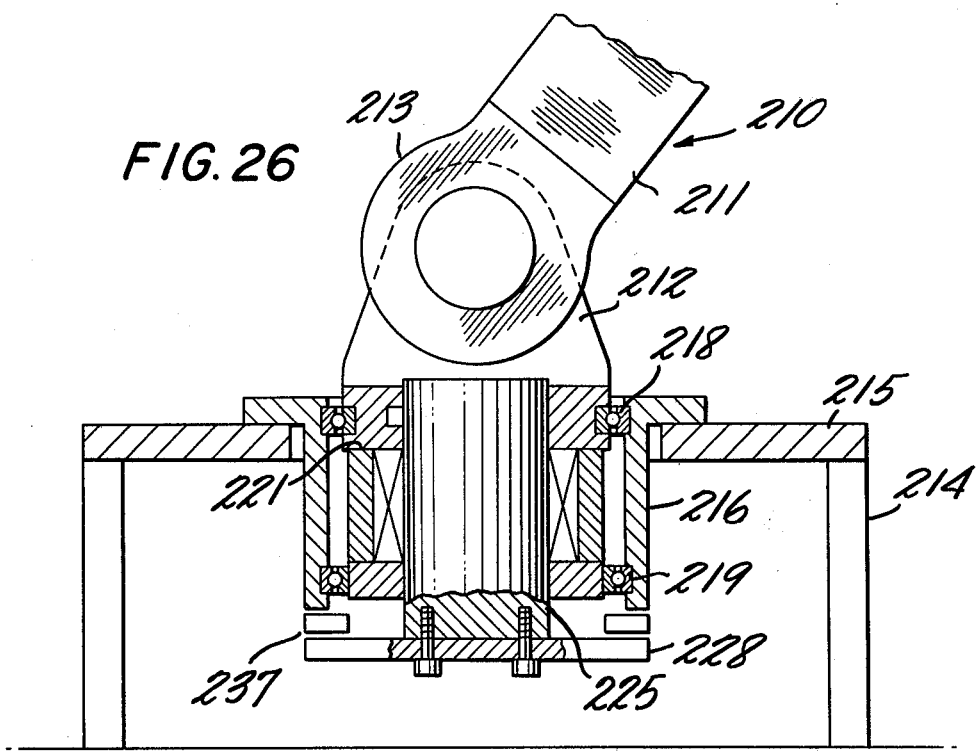
FIG. 26, is a fragmentary elevation view, partly in section of a robot according to the invention.
Figure 27:
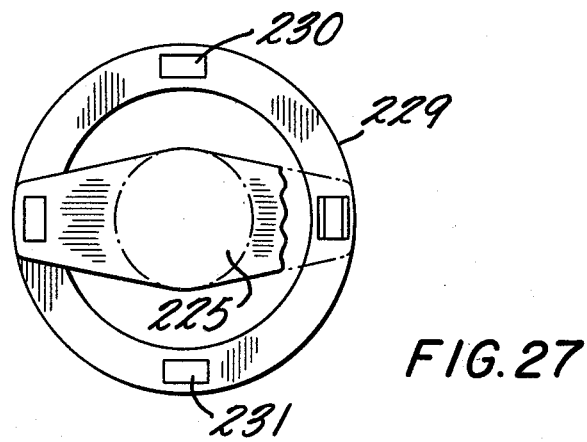
FIG. 27, is a plan view of elements of the robot in FIG. 26.

The movable blades mounted on the rotor are braked by the stationary blades fixed to the housing and make a full stop in close abutment thereto. In order to allow ease of separation of the movable and stationary blades from each other after contact either the stationary or movable vanes are provided with a mating surface 198 provided with a pattern of grooves 199 that have a cross section as illustrated in FIGS. 24 and 25. These grooves allow flow of hydraulic fluid between the contacting vane surfaces to allow ease of separation for reverse travel after contact has been made therebetween.

The vertical arm is rotatably driven by a hydraulic fluid motor or actuator as shown in FIGS. 26–29 wherein is illustrated a robot 210 having an upstanding arm section 211 on a mount 212 on which is mounted a dynamic fluid actuator 213, of the type above described, for moving the upstanding arm section relative to the vertical. The mount 212 is rotatable relative to a base pedestal 214 having a bedplate 215 on which a support 216 rests and has bearings 218, 219 on which a rotor 221 having vanes rotates and to which the mount 212 is fixed. A shaft 225 is stationary. The shaft 225 is connected to the support 216 by an OLDHAM coupling formed by half-couplings 228, ring 229 and keys 230, 231. This connection allows the shaft 225 to conform to the rotor both in a radial direction while supplying stiffness to the torsion or torque developed to which it reacts. The OLDHAM coupling must be retained between the keys 230 or 231 and the axial freedom is due to a clearance 237.

The regions 236 are large enough to allow the necessary radial movements according to a typical feature of the OLDHAM coupling. Axial freedom is provided by clearance 237. The transmission is achieved by means of a conic screw 240 which when tightened warps the region 243 due to a slit 245.

Movement in this embodiment is quite similar to the movement with respect to FIGS. 22-23 and 43-45. The only difference is that the rotor 221 is fixed to the mount 212 instead of the first arm section and the shaft 225 is fixed to the OLDHAM coupling instead of the second arm section.

Figure 30:
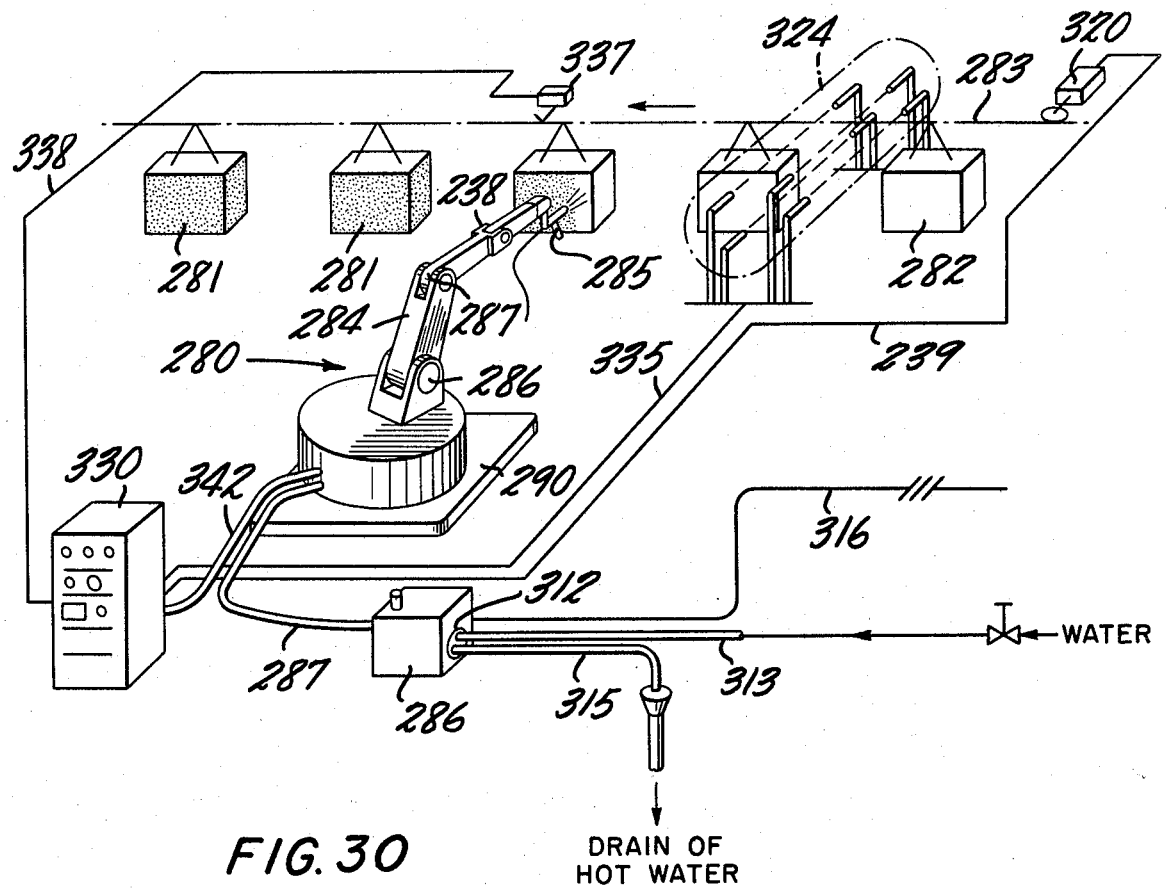
FIG. 30, is a diagram of a system with a robot according to the invention.

An operating robot 280 executing a painting function is illustrated in a system in FIG. 30. A plurality of similar workpieces 281 are shown as having been painted. A plurality of workpieces 282 are shown approaching a station for painting and it is assumed that they are all being transported by a conveyor 283. A robot operating arm unit 284 at the work or painting station is illustrated as carrying out the painting of the workpieces with a spray gun 285 connected to a source of paint, not shown.

Figure 31:
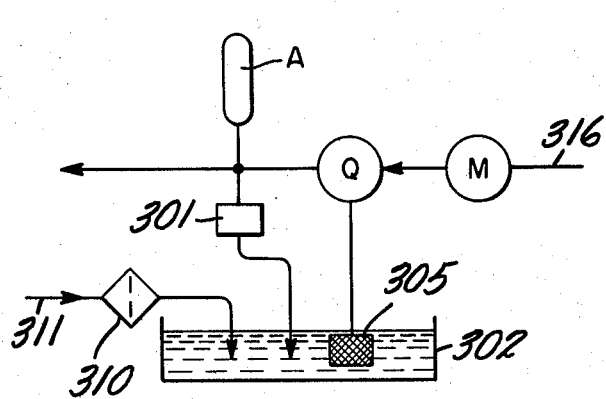
FIG. 31, is a diagram of a hydraulic station of the system in FIG. 30.

The robot 284 is supplied with hydraulic fluid from a hydraulic station 286 through a flexible hose 287. The hose connections on the robot to fluid actuators 286-287 and the one within a base pedestal 290 are not shown. These actuators are of the type before described. The hydraulic station is illustrated diagrammatically in FIG. 31 and comprises an electric motor M driving a variable delivery pump Q. An accumulator A, for periods of maximum demand, is provided on the pressure side of the pump having a by-pass valve 31 for completely draining fluid pressure, even in a normal state, but when there is an alarm (for example a trouble in the working robot) into a tank 302 from which the pump takes a suction through a filter 305. A filter 310 is provided in a return line 311.

The hydraulic fluid is cooled by a heat exchanger 312 supplied by cooling water through a line 313. The heated water is removed through a drain line 315. The hydraulic station heat exchanger maintains the hydraulic fluid at a constant temperature and the cooling water supply to the heat exchanger is controlled by a thermostatic valve, not shown. Electrical power is supplied to the motor through an electrical supply line 316.

Figure 32:
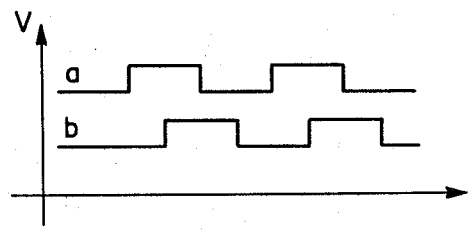
FIGS. 32-33, are wave diagrams of electrical signals of an encoder of the system in FIG. 30.
Figure 33:
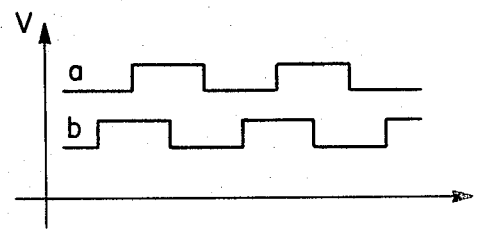

An encoder 320, connected to a control unit 303, senses the direction of travel of the conveyor and develops two channels a, b of square waves in quadrature as shown in FIGS. 32 and 33. The leading edge of the waves designates the direction of travel. Thus when the conveyor is travelling forwardly the channel a waves lead the channel b waves and the opposite is true when the conveyor is travelling in an opposite direction.

A sensing system 324 which may be photoelectric cells, for example, or microswitches senses the workpieces and the information is transmitted to the control unit 330 through a cable 335 to prepare for arrival of a workpiece at the work station where the operating robot 280 will carry out the painting operation. A detector or sensor 337 connected by a cable 338 to the control unit 330 detects the arrival of each workpiece at the work station. The encoder is connected to the control unit by a lead 239.

The control unit 330 has a memory within which the prior developed signals from a teaching arm are stored and these correspond to commands or instructions from the teaching arm unit of the robot which have been memorized to control the path of movement of the operating robot. The control unit 330 applies the command signals to the operating robot through a cable 342 once the position of the workpiece to be painted in the workpiece is detected.

Figure 34:
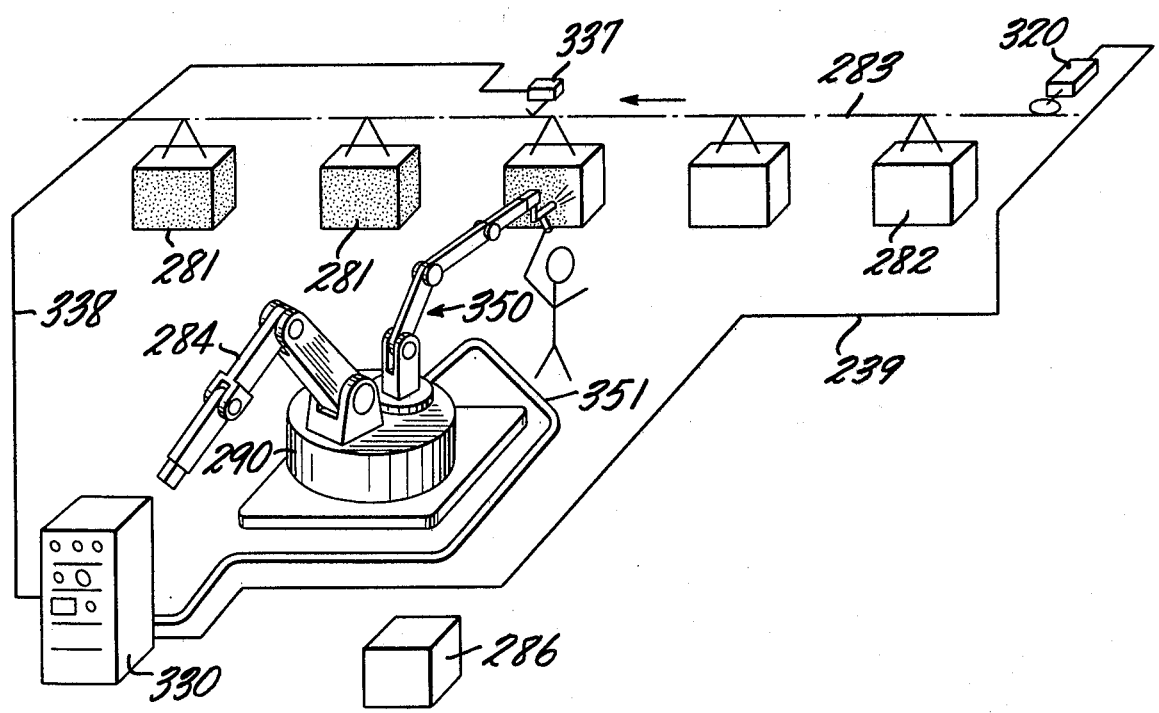
FIG. 34, is a fragmentary diagram of a system with a teaching robot according to the invention.

The same system is fragmentarily illustrated in FIG. 34 in which the robot 280 is illustrated as having a teaching arm unit 350 of the type described heretofore connected by a cable 351 to the control unit for developing the command signals memorized and later applied to the operating arm unit as before described. It can be seen that in the teaching mode the pedestal 290 of the robot is rotated 180° C. from its operating position in the operating mode in FIG. 30.

Figure 35:
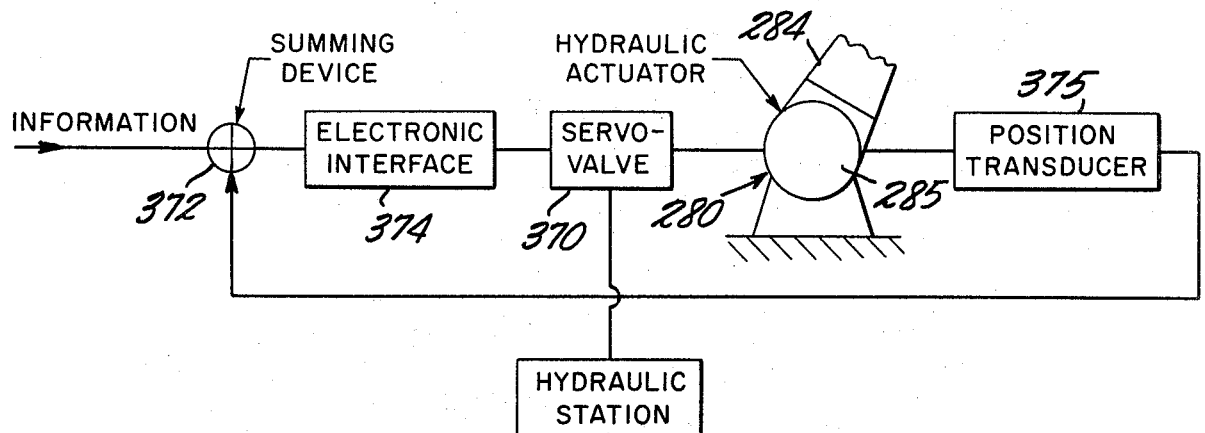
FIGS. 35-36, are diagrams for illustrating operating principles of the system in FIG. 34.

The operating robot 280 is controlled by loop control techniques as shown in FIG. 35. The command signals from the control unit are applied to a servo valve 370 for controlling the dynamic actuator 286 that controls the movement of the operating arm unit relative to its vertical position. The command signal is applied through an algebraic summing device 372 and electronic interface circuitry 374 to properly match the level of the signal to the operating voltage, for example, the servovalve. A position transducer 375 detects the movement of the upstanding arm 284 and transmits a correcting signal to the summing device 372 to correct the difference between the positioning signal applied to control the hydraulic actuator and the real or true position of the vertical arm. Hydraulic power is applied to the actuator from the hydraulic station 286 described heretofore.

Figure 36:
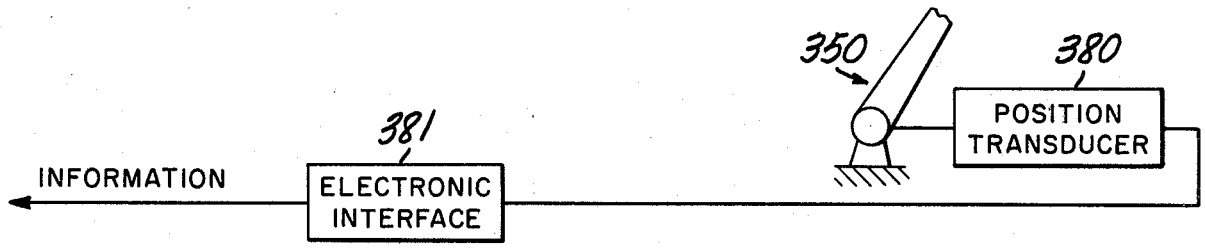

A schematic diagram in FIG. 36 illustrates the manner which the manually actuated teaching arm unit 350 has a position transducer 380. It transmits a signal to interface circuitry 381 to adapt it to a computer hereinafter described.

Figure 28:
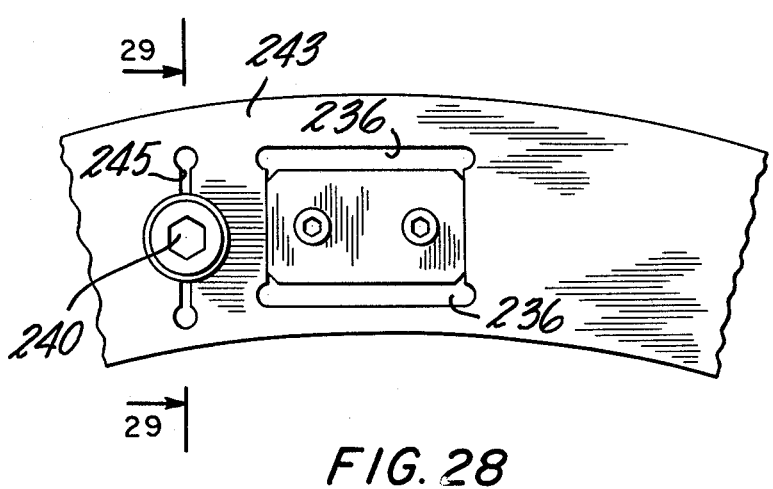
FIG. 28, is a fragmentary plan view of elements of the robot in FIG. 26.
Figure 29:
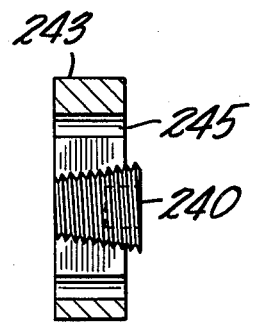
FIG. 29, is a section view taken along section line 28—28 in FIG. 28.
Figure 37:
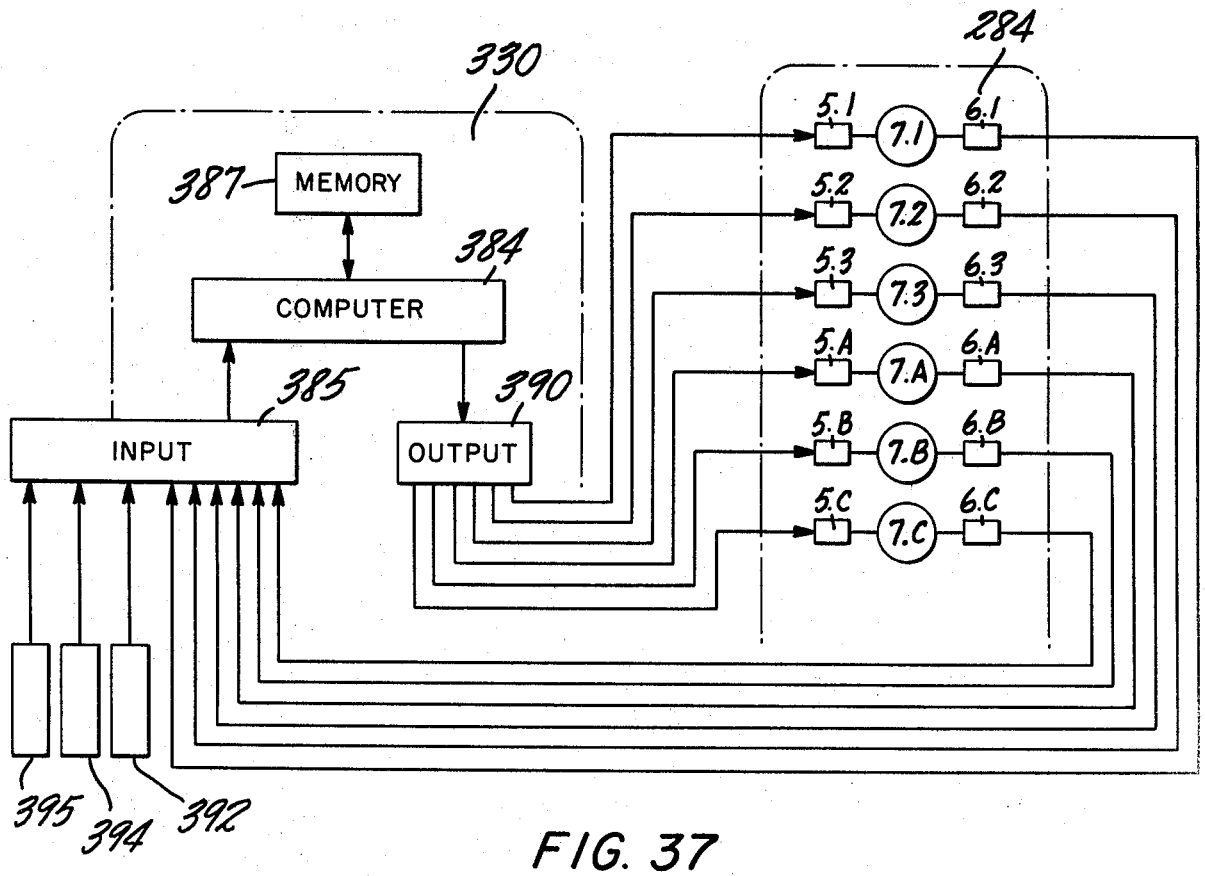
FIGS. 37-38, are diagrams illustrating circuitry of the system in FIG. 30.

A block diagram of the operating arm unit connections to the control unit 330 is shown in FIG. 37. The control unit 330 has a computer 384 to which an input panel 385 is connected for receiving inputs from transducers on the robot with respect to the operating arm unit as later explained. A storage device or memory 387 stores information signals applied through input circuitry panel 385. The output signals of the control unit are applied to an output panel 390 to servovalves 5.1, 5.2, 5.3 of the wrist and servovalves 5.A, 5.B, 5.C of the arm sections. The dynamic actuators 7.1-7.C corresponding to the actuators before described as to FIG. 28 are controlled by the servovalves 5. A plurality of transducers 6.1-6.3, 6.A, 6.B, 6.C sense the position of the actuators and apply corrective signals to the input panel as described with respect to FIG. 35. A synchronizer 392 provides synchronization between movements of the robot and the movement of the conveyor. However, this synchronizer need not be used when the workpiece is at a standstill when being painted. In such a case the synchronizer can be disconnected since the control unit can carry out operations on a pre-set time basis. The sensing system in this case diagram is illustrated by a block 394 and a start system is illustrated by a block 395.

Figure 38:
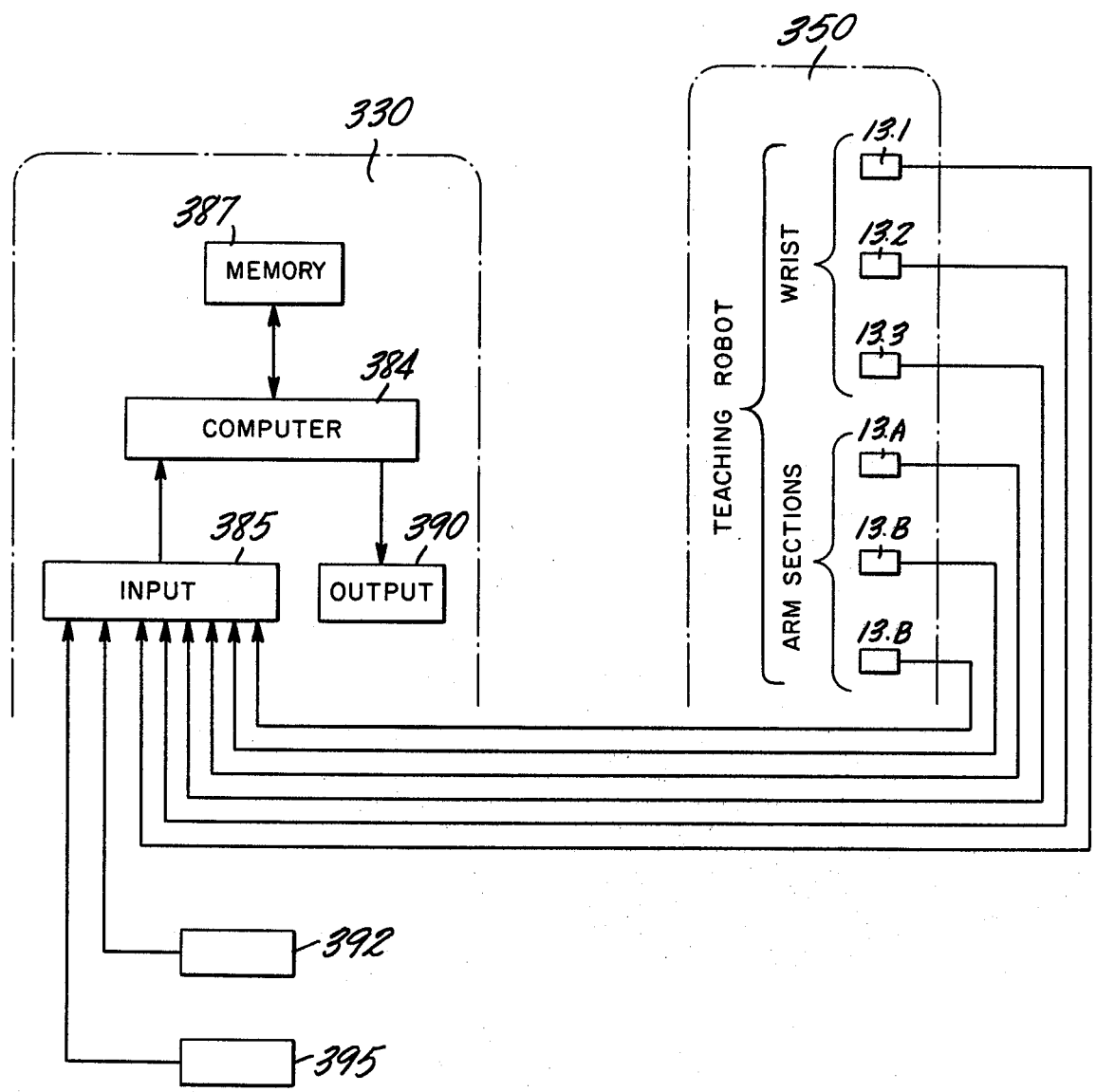

A block diagram of the connections between the teaching arm unit 350 and the control unit 330 is illustrated in FIG. 38. As can be seen when the robot is in a teaching mode of operation only inputs to the control unit 330 are applied. There are no outputs related to the teaching arm unit 350. The teaching arm unit 350 is provided with transducers 13.1-13.3 that sense the angular varying positions of the wrist pivots and apply their developed outputs as inputs to the control unit for storage in the storage device or memory 387. Transducers 13.A, 13.B, 13.C sense the varying angular positions of the pivots of the teaching arm sections and apply their derived signal outputs to the input panel of the control unit for storage in the storage device or memory 387 too.

The robot according to the invention can be used in a system wherein a plurality of robots are operating in an operational mode carrying out their functions with respect to the workpieces. Thus paired robots can paint opposite sides of vehicle bodies being transported from work station to work station. Furthermore, the operation or painting performed at the different work stations can be different. In arrangements like this the individual robots are programmed differently and the control unit can control a multiplicity of robots.

Moreover, the work performed by the robot according to the invention need not be painting. The tool used in programming can be a welding gun and in the operational mode the robot can weld. The example of painting operations is simply an example of work that requires the movement of a tool through space in a given pattern or path.

The robot is illustrated without showing the connections of the painting guns to sources of paint. Both the teaching paint gun and operating paint gun are connected to a source or sources of paint, now shown. Moreover, the hose connections to the actuators and all the servovalves of the operating arm unit, as described as to FIG. 37, are not shown. The servovalves are commanded by electrical signals, as shown in FIG. 37, to control application of the hydraulic fluid to the actuators of the operating arm unit.

Figure 39:
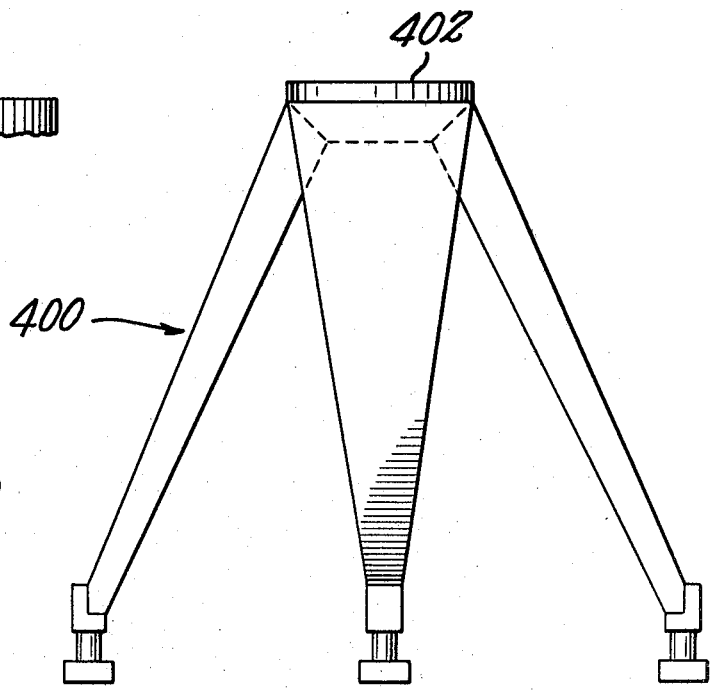
FIG. 39, is an elevation view of a tripod stand for use with a teaching arm unit of a robot according to the invention.

As before described the programming by the teaching arm unit need not be done on the base pedestal common to both units. The teaching arm unit, FIG. 39, can be mounted on a separate base such as a tripod 400 having a mounting plate 402 on which the teaching arm unit is secured. The signals developed by the teaching arm unit are memorized; however, the signals must be corrected as to the difference in the datum or reference used by the teaching arm unit when on a tripod relative to the datum or reference used by the operating robot with the operating arm unit thereon. Techniques for correcting the command signals as to this difference are well known in the art. (See FIG. 14).

Figure 41:
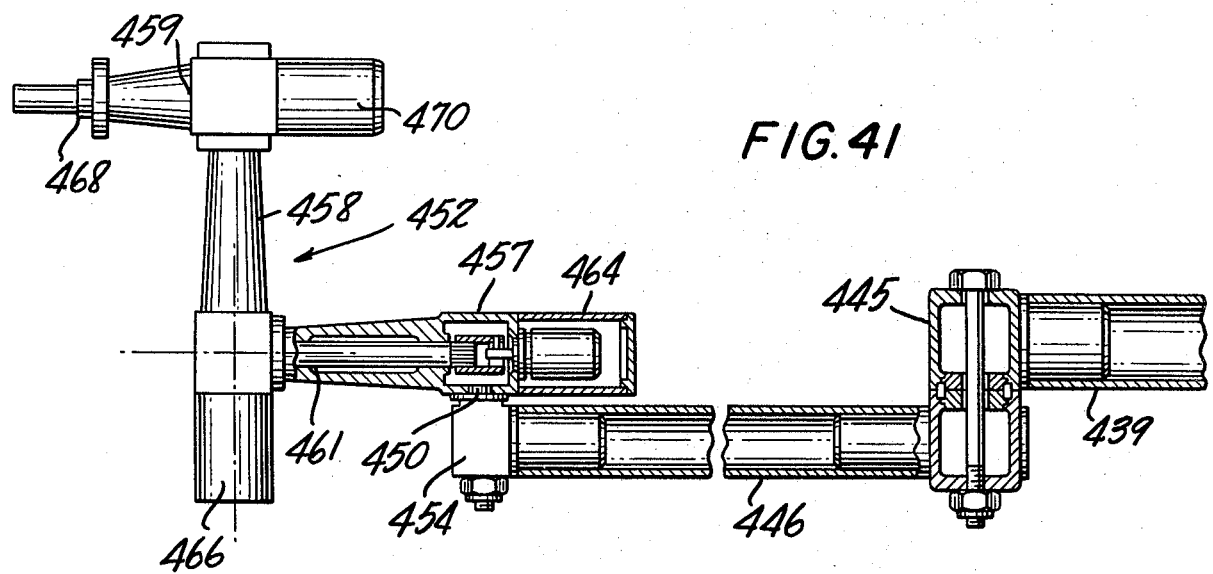
FIG. 41, is a fragmentary view, partly in section, of a part of the programming device illustrated in FIG. 40.
Figure 40:
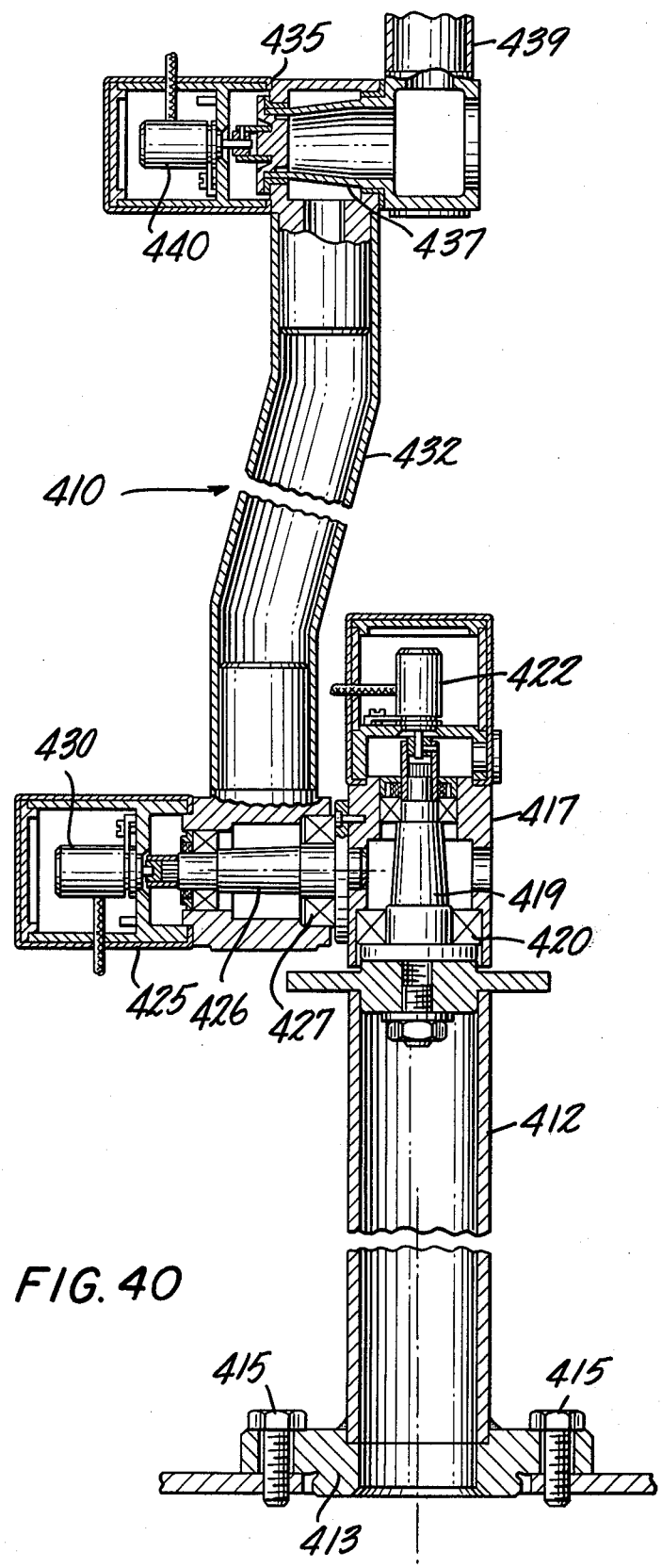
FIG. 40, is a fragmentary view, partly in section of a teaching arm unit for programming a robot according to the invention.

As before described the teaching arm can be constructed with the arm sections offset, etc. Another embodiment of a teaching arm unit is illustrated in FIGS. 40 and 41. Therein a teaching arm unit 410 has an upstanding arm section 412 provided with a flange 413 removably mounted by bolts 415 on a pedestal of a base, not shown, similar to one described above. When the teaching arm unit is removed from the robot a cover, now shown, can be placed over the mounting position of the teaching arm unit on the base.

The arm section 412 has a rotatable tower 417 within which is mounted a pivot 419 having a bearing 420 for allowing rotation about the longitudinal axis of the upstanding or upright arm section 412. This pivotal connection is provided with a transducer 422 that senses rotation of the tower about the longitudinal axis and generates an electrical signal applied to the command unit of a system in which the teaching arm unit is programming. The tower has a lateral extension 425 that will rotate on the pivot 419. Within this extension is mounted another pivot 426 having a bearing 427 to allow the extension to rotate relative to the tower. Rotation of the lateral extension 425 is sensed by a transducer and a corresponding electrical signal developed and memorized.

A second arm section 432 is fixed to the lateral extension and can move ahead and rearward. It has an elbow connection 435 having a pivot 437 to which is secured a third arm section 439. Rotation at the elbow connection is sensed by a transducer 440 and a corresponding signal is developed and memorized. This third arm section is the other arm section of the horizontal arm of the teaching arm unit.

This third arm section 439 has a connector 445 for fixedly connecting thereto an end portion or extension 446 on the third arm section. The connector 445 allows exchangeably securing different length extension sections on this third arm section. On the end of the extension a connection 450 integrally mounts a wrist 452.

The wrist 452 comprises three wrist sections 457, 458, 459. The first wrist section 457 is fixed to the connection 450 and it has a pivot 461 on which the second wrist section 458 pivots. A transducer 464 senses rotation of the second wrist section. The third wrist section 459 rotates on a pivot, not shown, within the second section and a transducer 466 senses this rotation. The third wrist section 459 has a tool mount 468 mounted for rotation on a pivot in the third wrist section 459 and a transducer 470 senses this rotation and generates a corresponding signal. The three wrist transducers 464, 466, 470 correspond to wrist transducers 13.1–13.3 shown in FIG. 38 and apply their generated signals to a control unit in a robot system as described above.

Figure 42:
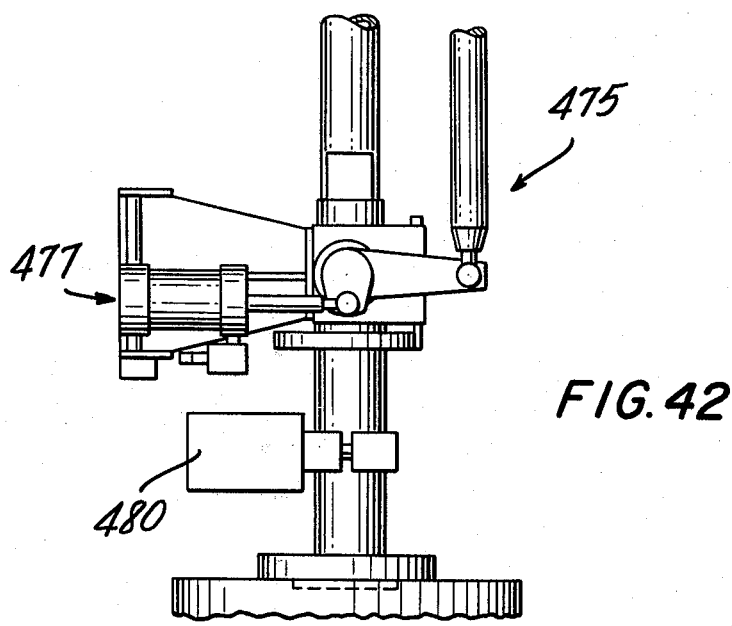
FIG. 42, is a fragmentary view of an embodiment of a teaching arm unit or programming device for a robot according to the invention.

A teaching arm unit structure 475 is fragmentarily illustrated in FIG. 42. The teaching arm unit is provided with a balancing or compensating system 477, of the type illustrated in FIG. 10, for compensating the gravitational forces acting on the horizontal arm sections, not shown, of this teaching arm unit. An electrical connection box 480 provides connections for the cable to the transducers, not shown, thereof.

Figure 43:
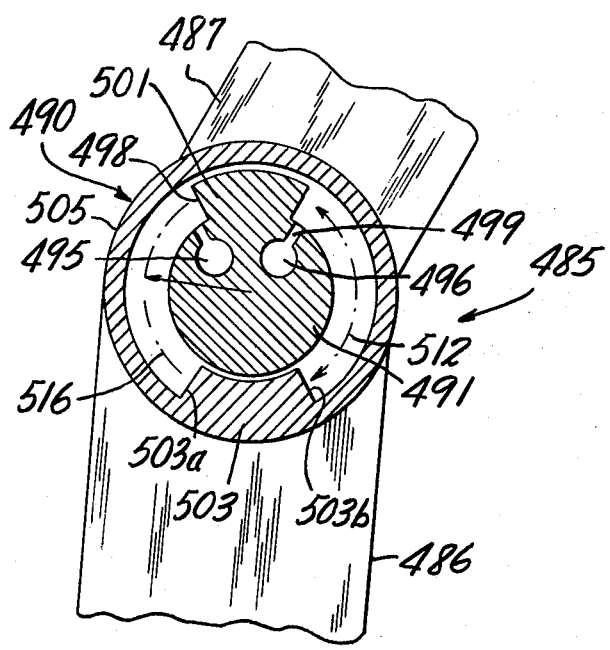
FIGS. 43-45, are fragmentary views, partly in section, of another embodiment of a fluid motor or actuator for powering an operating arm unit of a robot according to the invention.
Figure 44:
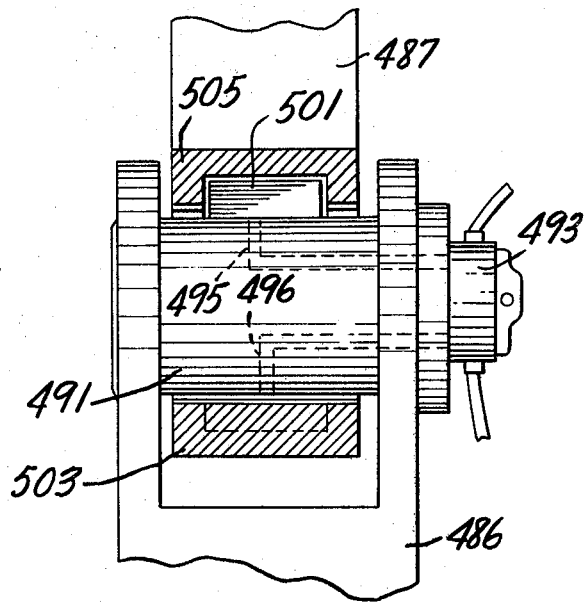
Figure 45:
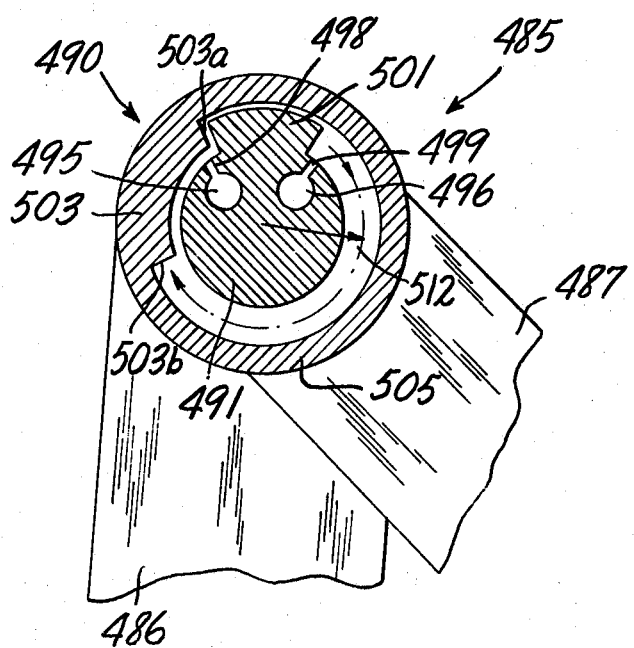

The fluid motors or actuators powering the operating arm unit of the robot and more particularly the operating arm sections can be made differently than those described heretofore. Another embodiment is illustrated in FIGS. 43–45 wherein an operating arm unit 485 is fragmentarily shown. The unit has an upright arm section 486 and a rear section 487 of a horizontal arm portion mounted thereto on a fluid actuated pivot provided by a hydraulic motor or actuator 490.

The hydraulic motor has a rotor 491 whose rotation is controlled by the application of fluid under pressure under control of a servo valve through the passages shown in FIG. 44. These passages 495, 496 are shown in cross section in FIGS. 43 and 45. They have restrictions 498, 499 for controlling braking of the rotor as the blade 501 thereon approaches a fixed blade 503 on a housing 505. The rotor defines two chambers 510, 512 in the housing and is rotated in opposite directions depending upon which passageway 495, 496 is placed in communication with the hydraulic fluid source. The movable vane moves in opposite directions until stopped by either of the opposite faces 503a, 503b of the stationary vane or stop 503.

Those skilled in the art will understand that the robot is very accurate in its programming because of the inertia-free characteristics of the teaching arm unit and the compensation of the gravitational forces continuously. Moreover, those skilled in the art will understand that the compensating devices are constructed to maintain substantially complete compensation of the gravitational forces since the compensating force is kept constant and the variation in the forces is compensated by variation of the effective lever arms to which the constant force is applied. The variation of the effective lever arms are in each instance a function of the varying position of the arm units of the robot and accordingly the varying positions of the center of gravity thereof.

Those skilled in the art will understand that the compensating devices apply a constant force along a straight line and that it is the point of application that is varying as the arm units change position since the pneumatic cylinder of each device varies in position to maintain a straight line of force application.

Those skilled in the art will also understand that the teaching step and the operating step are carried out at different times. Thus the teaching step will be carried out in advance of the operating step under conditions permitting the operator to manipulate the teaching arm under optimum teaching conditions.

What I claim is:

1. A teaching device for developing electrical signals for programming a robot comprising, a manually actuated programming device comprising, a mount, an upstanding first arm section movable on said mount to a vertical position and pivotally laterally relative to said vertical position, a second arm section pivotally mounted on said first arm section on an end portion thereof remote from said mount, a third arm section pivotally mounted on said second arm section on an end portion thereof remote from said upstanding arm section, a fluid-actuated compensating device connected to the first arm section to apply thereto a force of a constant value compensating a varying torque due to the effect of gravitational forces when said first arm section is inclined to the vertical, and the last-mentioned device including means for varying an effective lever arm through which said force of a constant value is applied.

2. A teaching device for developing electrical signals for programming a robot comprising, a manually actuated programming device comprising, a mount, an upstanding first arm section movable on said mount to a vertical position and pivotally laterally relative to said vertical position, a second arm section pivotally mounted on said first arm section on an end portion thereof remote from said mount, a third arm section pivotally mounted on said second arm section on an end portion thereof remote from said upstanding arm section, a fluid-actuated compensating device connected to the first arm section to apply thereto a force of a constant value compensating a varying torque due to the effect of gravitational forces when said first arm section is inclined to the vertical, said compensating device comprising a pneumatic cylinder having a constant pressure therein, means to maintain said constant pressure, and means for varying the effective lever arm to which said device applies a compensating force to compensate for a varying torque due to the effect of said gravitational forces.

3. A structure comprising a plurality of pivotally linked elongated arm sections, one arm section being movable to an upstanding vertical position and pivotally to positions inclined thereto, the other of said arm sections being disposed pivotally connected successively as a prolongation of and on a free end of said one arm section and movable relative to each other relative to the horizontal, means to variably continuously apply a constant force of a constant value to variably compensate for a varying torque due to the effect of gravitational forces on said arm sections to maintain said forces in equilibrium, and the last-mentioned means including means to vary the effective lever arm through which said force of a constant value is applied.

4. A teaching device for developing electrical signals having information content constituting instructions to a robot automatically controlled by said signals, comprising, an upstanding arm section, mounting means pivotally mounting the upstanding arm section for universal pivotal movement relative to a vertical position thereof, a horizontal arm having a first arm section pivotally on an end portion of said upstanding arm section remote from said mounting means for pivotal movement relative to the upstanding arm section, a second arm section on said horizontal arm pivotally mounted on said first arm section on an end portion thereof remote from said upstanding arm section, means for removably securing a working tool on said second arm section in the vicinity of a free end thereof manually movable along any desired path in three dimensions, an independent compensating means for dynamically continuously applying a constant balancing force of a constant value for continuously compensating a torque due to the effect of gravity on said upstanding arm section when inclined relative to the vertical and when the second arm section and third arm section are variably positioned relative to each other and relative to said upright arm section, and the last-mentioned means including means for varying an effective lever arm through which said force of a constant value is applied.

5. A robot having a powered operating arm unit comprising an elongated upstanding arm section movable manually to a vertical position and inclined relative thereto and two elongated arm sections pivotally connected as extensions of each other pivotally connected to a free end of said upstanding arm section, hydraulic powered actuators for moving said arm sections, means to apply command signals controlling the application of hydraulic fluid to said actuators, a programming means for developing a program constituting said command signals comprising a low-inertia teaching arm unit having light-weight arm sections joined pivotally for manual actuation and symmetrical to the operating arm unit, and a compensating system continuously applying a constant force for compensating for gravitational forces on said light-weight arm sections as their relative position is varied manually, and means in said compensating system varying the effective lever arm through which said force is applied as a function of the positions of said light-weight arms.

6. A robot having a powered arm unit having a plurality of pivotal arm sections movable in response to electrical command signals, means responsive to said command signals to move the arm sections, a light-weight programming device comprising a light-weight programming arm unit having pivotally joined arm sections, means to generate said signals in response to relative movement of the last-mentioned arm sections, and a compensating system applying a constant force of constant value to the last-mentioned arm sections to compensate for a torque due to gravitational forces and all variations thereof as said last-mentioned arm sections are manually moved to generate said signals including means in said compensating system to vary the effective lever arm to which said force of constant value is applied and vary said effective lever arm in dependence on positions to which said last-mentioned arm sections are moved and means to store the generated signals for use as said command signals.

7. A robot according to claim 6, in which said powered arm unit and said programming arm unit are symmetrically constructed.

8. A robot according to claim 7, including a base, both the arm units being symmetrically disposed thereon, and said base being rotatable to position the arm units alternatively in a given position.

9. A robot according to claim 7, including means removably attachable to said light-weight arm sections to simulate the dimensional thickness of the arm sections of the powered arm unit.

10. A robot having a powered arm unit having a plurality of pivotal arm sections movable in response to electrical command signals, means responsive to said command signals to move the arm sections, a light-weight programming device comprising a light-weight programming arm unit having pivotally joined arm sections, means to generate said signals in response to relative movement of the last-mentioned arm sections, and a compensating system applying a constant force to the last-mentioned arm sections to compensate gravitational forces and all variations thereof as said last-mentioned arm sections are manually moved to generate said signals including means to vary the effective lever arm to which said force is applied and vary said effective lever arm in dependence on positions to which said last-mentioned arm sections are moved, means to store the generated signals for use as said command signals, means removably attachable to said light-weight arm section to simulate the dimensional thickness of the arm sections of the powered arm unit, and said programming arm unit being symmetrically constructed.

* * * * *